US011400971B2

United States Patent
Nakamura et al.

(10) Patent No.: US 11,400,971 B2
(45) Date of Patent: Aug. 2, 2022

(54) ROTARY ELECTRIC MACHINE CONTROL DEVICE AND METHOD

(71) Applicant: DENSO CORPORATION, Kariya (JP)

(72) Inventors: Kouichi Nakamura, Kariya (JP); Nobuyori Nakazima, Kariya (JP); Yoshihide Kuroda, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 16/851,465

(22) Filed: Apr. 17, 2020

(65) Prior Publication Data

US 2020/0353975 A1 Nov. 12, 2020

(30) Foreign Application Priority Data

May 7, 2019 (JP) .............................. JP2019-087443

(51) Int. Cl.
*B62D 5/04* (2006.01)
*H02P 6/14* (2016.01)

(52) U.S. Cl.
CPC .............. *B62D 5/0463* (2013.01); *H02P 6/14* (2013.01)

(58) Field of Classification Search
CPC .... H02P 21/05; H02P 6/10; H02P 5/74; H02P 25/22; H02P 21/22; H02P 5/46; B62D 5/0484
See application file for complete search history.

(56) References Cited

U.S. PATENT DOCUMENTS

| 9,660,565 | B2 * | 5/2017 | Kuramitsu | ............. B62D 5/046 |
| 2017/0305459 | A1 * | 10/2017 | Minaki | ................ B62D 15/021 |
| 2018/0099690 | A1 * | 4/2018 | Oya | ..................... B62D 5/0466 |
| 2019/0016378 | A1 | 1/2019 | Itou et al. | |
| 2019/0241207 | A1 * | 8/2019 | Jeong | ................... B62D 5/0487 |
| 2019/0393820 | A1 * | 12/2019 | Kim | ....................... B62D 5/046 |
| 2020/0083826 | A1 * | 3/2020 | Woo | ..................... B62D 5/0463 |

FOREIGN PATENT DOCUMENTS

WO 2017/122562 A1 7/2017

OTHER PUBLICATIONS

U.S. Appl. No. 16/851,430 dated Apr. 17, 2020, filed Apr. 17, 2020, Nakamura et al.

* cited by examiner

*Primary Examiner* — Said Bouziane
(74) *Attorney, Agent, or Firm* — Maschoff Brennan

(57) ABSTRACT

An ECU includes a plurality of control circuits which is configured to control driving of a motor and communicate each other. The control circuits are configured to switch control modes including an ADS mode for controlling the driving of the motor based on a steering angle command $\theta s*$ and a torque control mode for controlling the driving of the motor based on a torque command value. A first control circuit, which calculates an EPS current command value shared by the plurality of control circuits in an EPS mode, and a second control circuit, which calculates an ADS current command value shared by the plurality of control units in an ADS mode, are different. This makes it possible to reduce a calculation load as compared with a case where the same control circuit serves as an EPS master and an ADS master.

16 Claims, 14 Drawing Sheets

FIG. 12

| CONTROL MODE | (C1) EPS MASTER / HIGH-LEVEL ECU | (C2) ADS MASTER / HIGH-LEVEL ECU | (C3) INTER-COMPUTER COMMUNICATION | ABNORMALITY-TIME PROCESS |
|---|---|---|---|---|
| EPS | ○ | ○ | ○ | — |
|  | ○ | ○ | × | INDEPENDENT DRIVING |
|  | ○ | × | ○ | ADS: NOT STARTED |
|  | ○ | × | × | ADS: NOT STARTED |
|  | × | ○ | ○ | ADS: NOT STARTED |
|  | × | ○ | × | ADS: NOT STARTED |
|  | × | × | ○/× | ASSIST STOP |
| ADS | ○ | ○ | ○ | — |
|  | ○ | ○ | × | ADS CONTINUATION BY INDEPENDENT DRIVING |
|  | ○ | × | ○ | TRANSITION FROM ADS STOP TO EPS |
|  | ○ | × | × | TRANSITION FROM ADS STOP TO EPS |
|  | × | ○ | ○ | ADS: CONTINUED BY ONLY SUB-ECU |
|  | × | ○ | × | ADS: CONTINUED BY ONLY SUB-ECU |
|  | × | × | ○/× | ASSIST STOP |

FIG. 13

| CONTROL MODE | (E1) EPS MASTER COMMAND CALCULATION | (E2) ADS MASTER COMMAND CALCULATION | (C3) INTER-COMPUTER COMMUNICATION | ABNORMALITY-TIME PROCESS |
|---|---|---|---|---|
| EPS | ○ | ○ | ○ | — |
| | ○ | ○ | × | INDEPENDENT DRIVING |
| | ○ | × | ○ | ONE SYSTEM DRIVING (SYSTEM L1) |
| | ○ | × | × | ONE SYSTEM DRIVING (SYSTEM L1) |
| | × | ○ | ○ | ONE SYSTEM DRIVING (SYSTEM L2) |
| | × | ○ | × | ONE SYSTEM DRIVING (SYSTEM L2) |
| | × | × | ○/× | ASSIST STOP |
| ADS | ○ | ○ | ○ | — |
| | ○ | ○ | × | ADS CONTINUATION BY INDEPENDENT DRIVING |
| | ○ | × | ○ | TRANSITION FROM ADS STOP TO EPS |
| | ○ | × | × | TRANSITION FROM ADS STOP TO EPS |
| | × | ○ | ○ | ADS CONTINUATION BY ONLY SYSTEM L2 |
| | × | ○ | × | ADS CONTINUATION BY ONLY SYSTEM L2 |
| | × | × | ○/× | ASSIST STOP |

FIG. 14

| CONTROL MODE | (D1) EPS MASTER DRIVING SYSTEM | (D2) ADS MASTER DRIVING SYSTEM | (C3) INTER-COMPUTER COMMUNICATION | ABNORMALITY-TIME PROCESS |
|---|---|---|---|---|
| EPS | ○ | ○ | ○ | — |
| | ○ | ○ | × | INDEPENDENT DRIVING |
| | ○ | × | ○ | ONE SYSTEM DRIVING (SYSTEM L1) |
| | ○ | × | × | ONE SYSTEM DRIVING (SYSTEM L1) |
| | × | ○ | ○ | ONE SYSTEM DRIVING (SYSTEM L2) |
| | × | ○ | × | ONE SYSTEM DRIVING (SYSTEM L2) |
| | × | × | ○/× | ASSIST STOP |
| ADS | ○ | ○ | ○ | — |
| | ○ | ○ | × | ADS CONTINUATION BY INDEPENDENT DRIVING |
| | ○ | × | ○ | TRANSITION FROM ADS STOP TO EPS |
| | ○ | × | × | TRANSITION FROM ADS STOP TO EPS |
| | × | ○ | ○ | ADS CONTINUATION BY ONLY SYSTEM L2 |
| | × | ○ | × | ADS CONTINUATION BY ONLY SYSTEM L2 |
| | × | × | ○/× | ASSIST STOP |

ROTARY ELECTRIC MACHINE CONTROL DEVICE AND METHOD

CROSS REFERENCE TO RELATED APPLICATION

The present application claims the benefit of priority from Japanese Patent Application No. 2019-087443 filed on May 7, 2019. The entire disclosures of the above application are incorporated herein by reference.

FIELD

The present disclosure relates to a rotary electric machine control device and method.

BACKGROUND

A conventional steering apparatus includes an electric driving device and a steering mechanism. A conventional control device has a function of executing each control of automatic steering control for performing automatic steering and assist control for assisting a driver's steering torque. The control device performs both of the automatic steering control and the assist control, and hence has a heavy calculation load.

SUMMARY

According to the present disclosure, a rotary electric machine control device is provided for controlling driving of a motor having a motor winding. The rotary electric machine control device comprises a plurality of control circuits configured to communicate mutually and switch a control mode including an angle control mode and a torque control mode, which control the driving of the rotary electric machine based on an angle command value and a torque command value, respectively. The plurality of control circuits includes a master torque control section, which is configured to calculate a master torque control command value shared by the plurality of control circuits in the torque control mode, and a master angle control section, which is configured to calculate a master angle control command value shared by the plurality of control circuits in the angle control mode.

BRIEF DESCRIPTION OF THE DRAWINGS

FIG. 12 is an explanatory diagram showing an abnormal time process performed at the time of occurrence of a communication abnormality in the third embodiment;

FIG. 13 is an explanatory diagram showing an abnormal time process performed at the time of occurrence of a command calculation abnormality in the third embodiment; and FIG. 14 is an explanatory diagram showing an abnormal time process performed at the time of occurrence of a driving system abnormality in the third embodiment.

DETAILED DESCRIPTION OF THE EMBODIMENT

Embodiment

Figure 1:
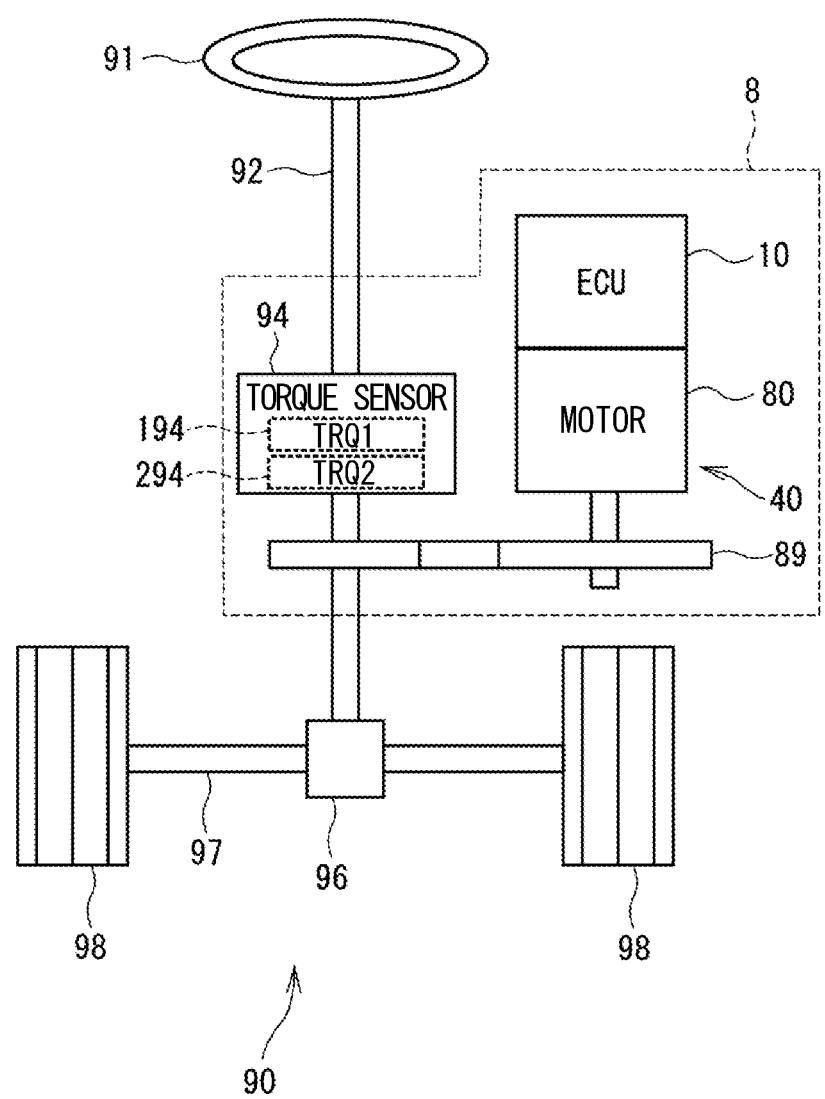
FIG. 1 is a schematic structural diagram showing a steering system including a rotary electric machine control device according to a first embodiment.

Hereinafter, a rotary electric machine control device according to the present disclosure will be described with reference to plural embodiments shown in the drawings. In the following description, same or similar structural components and control process steps are indicated by the same reference numerals throughout the embodiments. The rotary electric machine control device according to the first embodiment is shown in FIG. 1 to FIG. 9. As shown in FIG. 1, an ECU 10 provided as a rotary electric machine control device is a motor control device configured to control driving of a motor 80 that is a rotary electric machine. The ECU 10 is used together with the motor 80 as an electric power steering apparatus 8 that assists a steering operation of a vehicle.

FIG. 1 shows a configuration of a steering system 90 including the electric power steering apparatus 8. The steering system 90 includes a steering wheel 91, which is a steering member, a steering shaft 92, a pinion gear 96, a rack shaft 97, a pair of road wheels 98 and the electric power steering apparatus 8.

The steering wheel 91 is connected to the steering shaft 92. A torque sensor 94 is provided on the steering shaft 92 to detect a steering torque. The torque sensor 94 has a first sensor unit 194 and a second sensor unit 294, each of which is capable of detecting its own failure. A pinion gear 96 is provided at an axial end of the steering shaft 92. The pinion gear 96 meshes with a rack shaft 97. The road wheels 98 are coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a linear movement of the rack shaft 97 by the pinion gear 96. The road wheels 98 are steered to an angle corresponding to the displacement amount of the rack shaft 97.

The electric power steering apparatus 8 includes a reduction gear 89 and the like in addition to the motor 80 and the ECU 10. The reduction gear 89 is a power transmission mechanism that reduces the rotation of the motor 80 and transmits the reduced rotation to the steering shaft 92. The electric power steering apparatus 8 of the present embodiment is a column assist type. It may alternatively be a rack assist type that transmits the rotation of the motor 80 to the rack shaft 97. In the present embodiment, the steering shaft 92 is a driven object.

Figure 2:
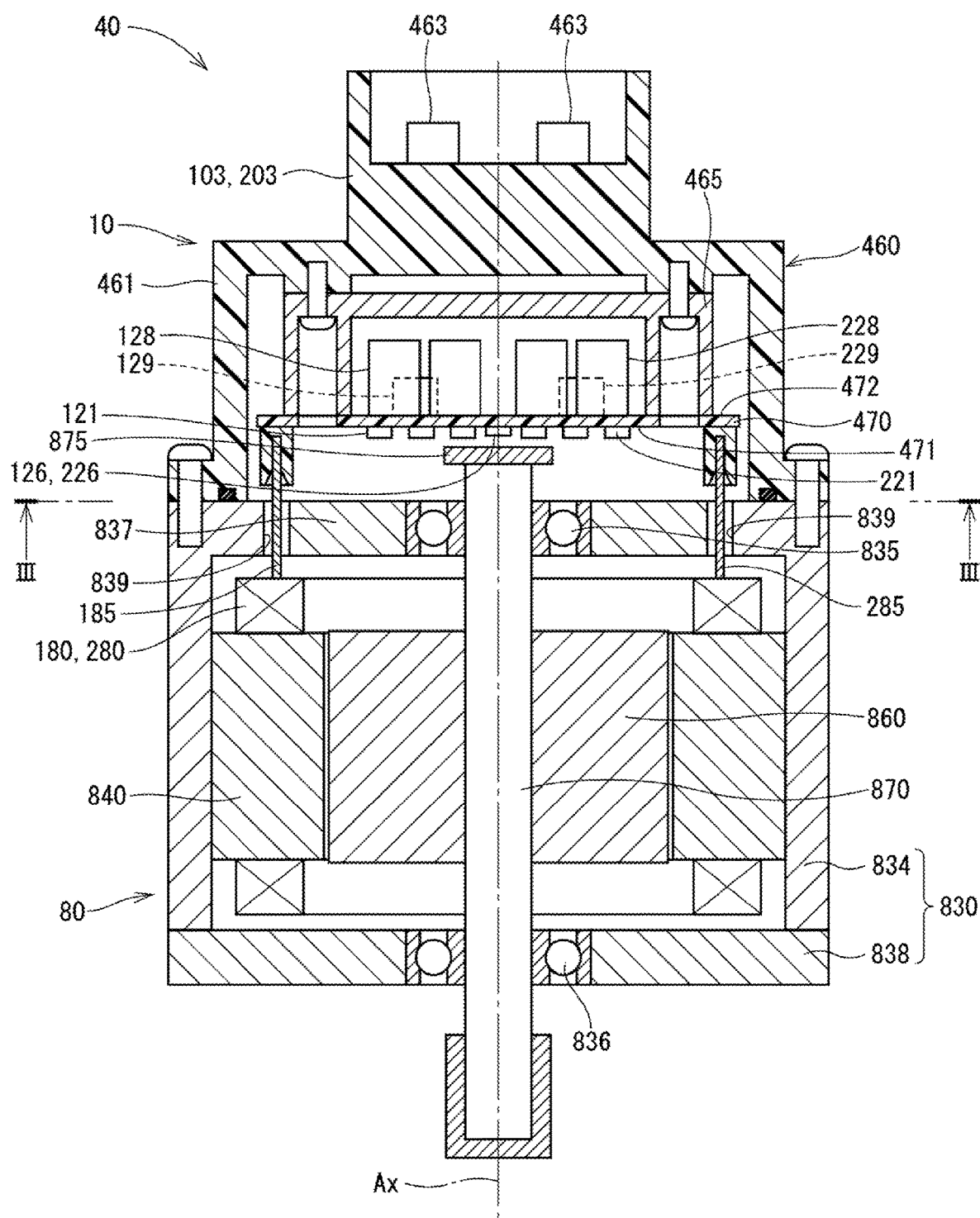
FIG. 2 is a cross-sectional view showing a driving device in the first embodiment.

As shown in FIG. 1 to FIG. 4, the motor 80 outputs a whole or a part of a torque required for a steering operation. The motor 80 is driven by electric power supplied from batteries 101 and 201 provided as direct current power supplies to rotate the reduction gear 89 in forward and reverse directions. The motor 80 is a three-phase brushless motor and has a rotor 860 and a stator 840 as shown in FIG. 2.

The motor 80 has a first motor winding 180 and a second motor winding 280 as a winding set. The motor windings 180 and 280 have the same electrical characteristics and are wound about the stator 840 with electrical angles shifted from each other by 30 degrees. Correspondingly, phase currents are controlled to be supplied to the motor windings 180 and 280 such that the phase currents have a phase difference D of 30 degrees. By optimizing a current supply phase difference, the output torque is improved. In addition, sixth-order torque ripple can be reduced, and noise and vibration can be reduced. The noise and vibration is abbreviated as NV in the following description. In addition, since heat is also distributed and averaged by distributing the current, it is possible to reduce temperature-dependent system errors such as a detection value and torque of each sensor and increase the amount of current that is allowed to be supplied. The electrical characteristics of the motor windings 180 and 280 may be different.

Hereinafter, a combination of a first inverter circuit 120 and a first control circuit 150 and the like, which are related to the driving control for the first motor winding 180, is referred to as a first system L1, and a combination of a second inverter circuit 220 and a second control circuit 250 and the like, which are related to the driving control for the second motor winding 280, is referred to as a second system L2. The structural components related to the first system L1 are basically indicated with reference numerals of 100, and the structural components related to the second system L2 are basically indicated with reference numerals of 200. In the first system L1 and the second system L2, same or similar structural components are indicated with same reference numbers in the least significant two digits. For the other configuration described below, the term "first" is indicated with a suffix "1," and the term "second" is indicated with a suffix "2."

In the driving device 40, the ECU 10 is integrally provided on one side in the axial direction of the motor 80 in a machine-electronics integrated type. The motor 80 and the ECU 10 may alternatively be provided separately. The ECU 10 is positioned coaxially with an axis Ax of the shaft 870 on the side opposite to the output shaft of the motor 80. The ECU 10 may alternatively be provided on the output shaft side of the motor 80. By adopting the machine-electronics integrated type, it is possible to space-efficiently arrange the ECU 10 and the motor 80 in a vehicle having restricted mounting space.

The motor 80 includes the stator 840, the rotor 860 and a housing 830, which houses the stator 840 and the rotor 860 therein. The stator 840 is fixed to the housing 830 and the motor windings 180 and 280 are wound thereon. The rotor 860 is provided radially inside the stator 840 to be rotatable relative to the stator 840.

The shaft 870 is fitted firmly in the rotor 860 to rotate integrally with the rotor 860. The shaft 870 is rotatably supported by the housing 830 through bearings 835 and 836. The end portion of the shaft 870 on the ECU 10 side protrudes from the housing 830 to the ECU 10 side. A magnet 875 is provided at the axial end of the shaft 870 on the ECU 10 side.

The housing 830 has a bottomed cylindrical case 834, which has a rear end frame 837, and a front end frame 838 provided on an open side of the case 834. The case 834 and the front end frame 838 are fastened to each other by bolts or the like. Lead wire insertion holes 839 are formed in the rear end frame 837. Lead wires 185 and 285 connected to each phase of the motor windings 180 and 280 are inserted through the lead wire insertion holes 839. The lead wires 185 and 285 are taken out from the lead wire insertion holes 839 to the ECU 10 side and connected to a circuit board 470 of the ECU 10.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects the electronic components from external impacts and prevents dust, water or the like from entering into the ECU 10. In the cover 460, a cover main body 461 and connector members 103 and 203 are integrally formed. The connector members 103 and 203 may alternatively be separated from the cover main body 461. Terminals 463 of the connector members 103 and 203 are connected to the circuit board 470 via wirings (not shown) or the like. The number of connectors and the number of terminals may be changed in correspondence to the number of signals and the like. The connector members 103 and 203 are provided at the end portion in the axial direction of the driving device 40 and is open on the side opposite to the motor 80.

The circuit board 470 is, for example, a printed circuit board, and is positioned to face the rear end frame 837. On the circuit board 470, the electronic components of the first and second systems are mounted independently for each system so that the two systems are provided in a fully redundant configuration. According to the present embodiment, the electronic components are mounted on one circuit board 470. The electronic components may alternatively be mounted on plural circuit boards.

Figure 3:
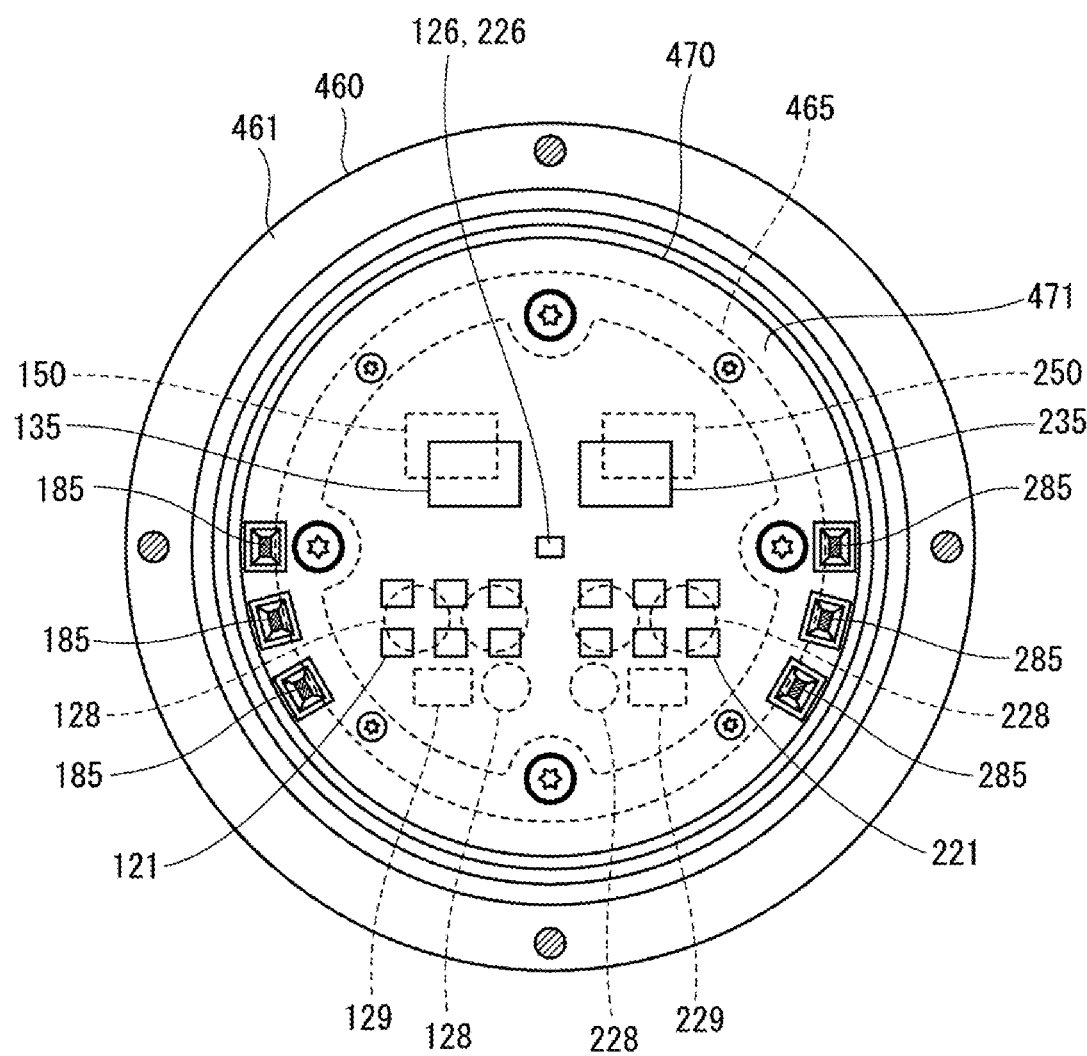
FIG. 3 is a cross-sectional view taken along a line III-III in FIG. 2.

Of the two principal surfaces of the circuit board 470, one surface on the side of the motor 80 is referred to as a motor-side surface 471 and the other surface on the side of the cover 460 is referred to as a cover-side surface 472. As shown in FIG. 3, switching elements 121 of the inverter circuit 120, switching elements 221 of the inverter circuit 220, rotation angle sensors 126, 226, custom ICs 135, 235 and the like are mounted on the motor-side surface 471. The rotation angle sensors 126 and 226 are mounted at positions facing the magnet 875 to detect a change in the magnetic field caused by the rotation of the magnet 875.

On the cover-side surface 472, capacitors 128, 228, inductors 129, 229, and first and second microcomputers forming the first and second control circuits 150, 250, respectively, are mounted. In FIG. 3, reference numerals 150 and 250 are assigned to the microcomputers provided as the control circuits 150 and 250, respectively. The capacitors 128 and 228 smoothen electrical power input from the batteries 101 and 201 (see FIG. 4). The capacitors 128 and 228 assist electric power supply to the motor 80 by storing electric charge therein. The capacitors 128, 228 and the inductors 129, 229 configure filter circuits, respectively, to reduce noises transmitted from other devices which share the battery, and also to reduce noises transmitted to the other devices, which share the battery, from the driving device 40. Although not shown in FIG. 3, power supply relays 122, 222, motor relays 125, 225, current sensors 127, 227 and the like are also mounted on the motor-side surface 471 or the cover-side surface 472.

Figure 4:
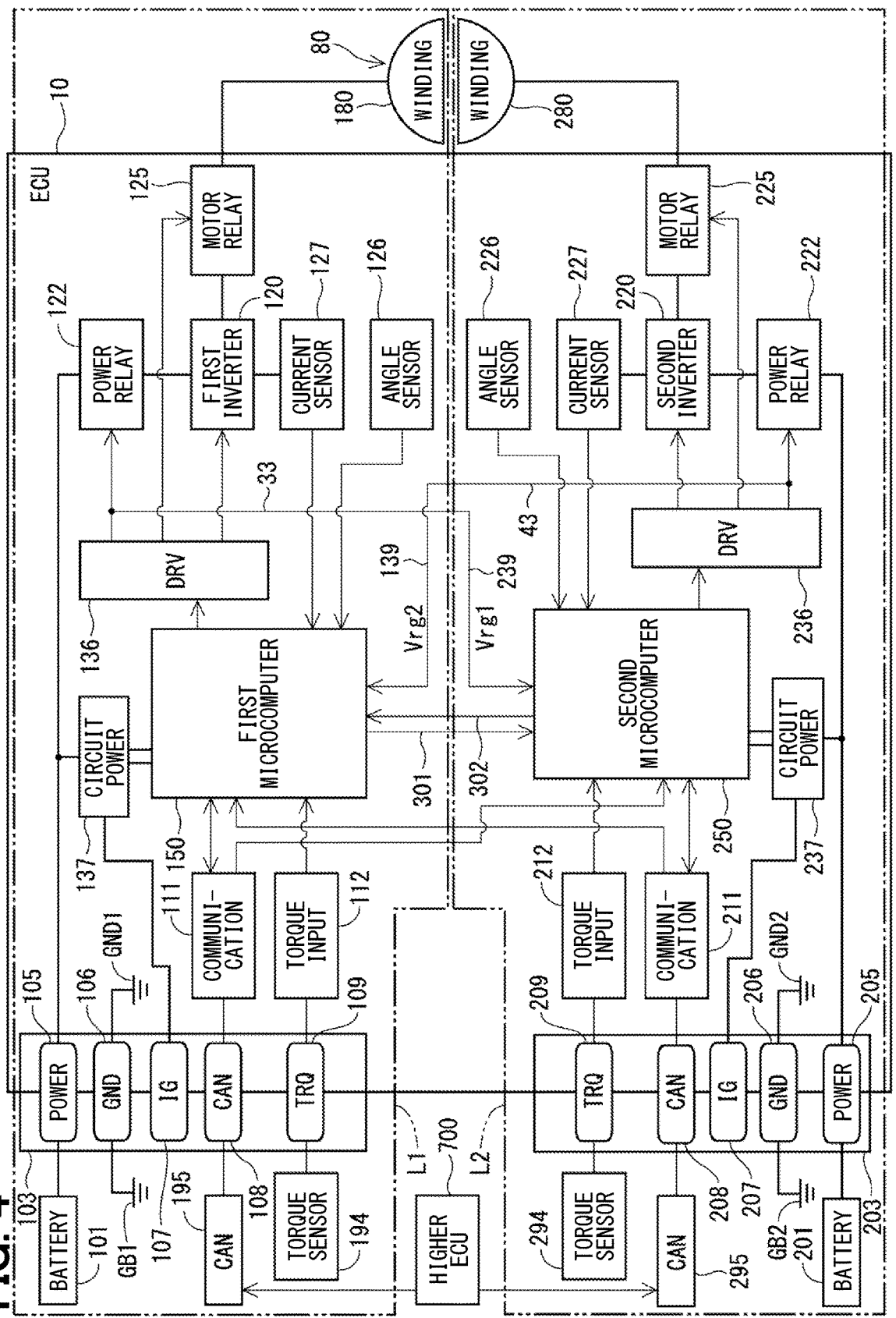
FIG. 4 is a block diagram showing an ECU in the first embodiment.

As shown in FIG. 4, the ECU 10 includes the inverter circuits 120, 220 and the control circuits 150, 250. In this figure and the like, the control circuit is referred to as the microcomputer (MC). The ECU 10 is provided with the first and second connector members 103 and 203. The first connector member 103 is provided with a first power supply terminal 105, a first ground terminal 106, a first IG terminal 107, a first communication terminal 108, and a first torque terminal 109.

The first power supply terminal 105 is connected to the first battery 101 via a fuse (not shown). The electric power supplied from the positive electrode of the first battery 101 via the first power supply terminal 105 is supplied to the first motor winding 180 via the power supply relay 122, the inverter circuit 120, and the motor relay 125. The first ground terminal 106 is connected to a first ground GND1 that is a first system ground inside the ECU 10 and a first external ground GB1 that is a first system ground outside the ECU 10. In a vehicle system, a metal chassis body is a common GND plane. The first external ground GB1 indicates one of the connection points on the GND plane. The negative electrode of the first battery 101 is also connected to the connection point on the GND plane.

The first IG terminal 107 is connected to the positive electrode of the first battery 101 via a first switch that is on/off-controlled in conjunction with a vehicle start switch such as an ignition (IG) switch. The electric power supplied from the first battery 101 via the first IG terminal 107 is supplied to the first custom IC 135. The first custom IC 135 includes a first driver circuit 136, a first circuit power supply 137, a microcomputer monitor (not shown), a current monitor amplifier (not shown), and the like.

The first communication terminal 108 is connected to a first vehicle communication circuit 111 and a first vehicle communication network 195. The first vehicle communication network 195 and the first control circuit 150 are connected via a first vehicle communication circuit 111 so that signal transmission and reception are performed. Further, the first vehicle communication network 195 and the second control circuit 250 are connected so that only signal reception is performed by the second control circuit 250. Thus, even in case the second control circuit 250 fails to operate normally, the first vehicle communication network 195 including the first control circuit 150 is not affected.

The first torque terminal 109 is connected to the first sensor unit 194 of the torque sensor 94. The detection value of the first sensor unit 194 is input to the first control circuit 150 via the first torque terminal 109 and a first torque sensor input circuit 112. Here, the first sensor unit 194 and the first control circuit 150 are configured such that a failure of the torque sensor input circuit system is detected.

The second connector unit 203 is provided with a second power supply terminal 205, a second ground terminal 206, a second IG terminal 207, a second communication terminal 208, and a second torque terminal 209. The second power supply terminal 205 is connected to the positive electrode of the second battery 201 via a fuse (not shown). The electric power supplied from the positive electrode of the second battery 201 via the second power supply terminal 205 is supplied to the second motor winding 280 via the power supply relay 222, the inverter circuit 220, and the motor relay 225.

The second ground terminal 206 is connected to a second ground GND2 that is a second system ground inside the ECU 10 and a second external ground GB2 that is a second system ground outside the ECU 10. In the vehicle system, the metal chassis body is the common GND plane. The second external ground GB2 indicates one of the connection points on the GND plane. The negative electrode of the second battery 201 is also connected to the connection point on the GND plane. Here, at least different systems are configured not to connect to the same connection point on the GND plane.

The second IG terminal 207 is connected to the positive electrode of the second battery 201 via a second switch that is on/off-controlled in conjunction with the start switch of the vehicle. The electric power supplied from the second battery 201 via the second IG terminal 207 is supplied to the second custom IC 235. The second custom IC 235 includes a second driver circuit 236, a second circuit power supply 237, a microcomputer monitor (not shown), a current monitor amplifier (not shown) and the like.

The second communication terminal 208 is connected to a second vehicle communication circuit 211 and a second vehicle communication network 295. The second vehicle communication network 295 and the second control circuit 250 are connected via the second vehicle communication circuit 211 to be capable of signal transmission and reception. Further, the second vehicle communication network 295 and the first control circuit 150 are connected so that only signal reception is performed by the first control circuit 150. Thus, even in case the first control circuit 150 fails to operate normally, the second vehicle communication network 295 including the second control circuit 250 is not affected.

The second torque terminal 209 is connected to the second sensor unit 294 of the torque sensor 94. The detection value of the second sensor unit 294 is input to the second control circuit 250 via the second torque terminal 209 and the second torque sensor input circuit 212. Here, the second sensor unit 294 and the second control circuit 250 are configured such that a failure of the torque sensor input circuit system is detected.

In FIG. 4, the communication terminals 108 and 208 are connected to separate vehicle communication networks 195 and 295, respectively, but may be connected to a same vehicle communication network. Regarding the vehicle communication networks 195 and 295 in FIG. 4, CAN (controller area network) is exemplified. However, any other standard such as CAN-FD (CAN with flexible data rate) or FlexRay may be employed.

The first inverter circuit 120 is a three-phase inverter having the switching elements 121 shown in FIG. 3 and converts electric power for the first motor winding 180. The second inverter circuit 220 is a three-phase inverter having the switching elements 221 shown in FIG. 3 and converts electric power for the second motor winding 280.

The first power supply relay 122 is provided between the first power supply terminal 105 and the first inverter circuit 120. The first motor relay 125 is provided in each phase between the first inverter circuit 120 and the first motor winding 180. The second power supply relay 222 is provided between the second power supply terminal 205 and the second inverter circuit 220. The second motor relay 225 is provided in each phase between the second inverter circuit 220 and the second motor winding 280.

In the present embodiment, the switching elements 121 and 221, the power supply relays 122 and 222, and the motor relays 125 and 225 are all MOSFETs, but other elements such as IGBTs may alternatively be used. In case that the first power supply relay 122 is configured by a switching element such as a MOSFET having a parasitic diode, it is preferred that two switching elements are connected in series so that the directions of the parasitic diodes are reversed. The same applies to the second power supply relay 222. Thereby, even when the batteries 101 and 201 are erroneously connected in the reverse direction, it is possible to prevent a reverse current from flowing. Further, the power supply relays 122 and 222 may be mechanical relays.

Operations of the first switching elements 221 (refer to FIG. 3), the first power supply relay 122 and the first motor relay 125 are on/off-controlled by the first control circuit 150. Operations of the second switching elements 221 (refer to FIG. 3), the second power supply relay 222 and the second motor relay 225 are on/off-controlled by the second control circuit 250.

The first rotation angle sensor 126 detects the rotation angle of the motor 80 and outputs a detected value to the first control circuit 150. The second rotation angle sensor 226 detects the rotation angle of the motor 80 and outputs a detected value to the second control circuit 250. The first rotation angle sensor 126 and the first control circuit 150, and the second rotation angle sensor 226 and the second control circuit 250 are configured such that a failure of each rotation angle sensor input circuit system is detected.

A first current sensor 127 detects a current that is supplied to each phase of the first motor winding 180. A detection value of the first current sensor 127 is amplified by an amplifier circuit in the custom IC 135 and output to the first control circuit 150. A second current sensor 227 detects a current that is supplied to each phase of the second motor winding 280. A detection value of the second current sensor 227 is amplified by an amplifier circuit in the custom IC 235 and output to the second control circuit 250.

The first driver circuit 136 outputs driving signals to each element for driving the first switching elements 121, the first power supply relay 122 and the first motor relay 125 based on control signals from the first control circuit 150. The second driver circuit 236 outputs driving signals to each element for driving the second switching elements 221, the second power supply relay 222 and the second motor relay 225 based on control signals from the second control circuit 250.

Each of the first and second control circuits 150 and 250 is mainly composed of a microcomputer and the like, and internally includes, although not shown in the figure, a CPU, a ROM, a RAM, an I/O, a bus line for connecting these components, and the like. Processes performed by each of the control circuits 150 and 250 may be software process or may be hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit. In the present embodiment, the first control circuit 150 and the second control circuit 250 are configured such that, for example, a locked-step dual microcomputer or the like is used to and their own failures are detected.

The control circuits 150 and 250 are capable of transmitting and receiving information to and from each other by the inter-microcomputer communication. This communication is referred to as an inter-computer communication. Further, the control circuits 150 and 250 acquire an automatic operation command including a steering angle command θs* from a high level ECU (higher ECU) 700 such as a master ECU provided as an external control unit via the vehicle communication networks 195 and 295. The high-level ECU 700 is, for example, an ADS-ECU or the like that performs automatic driving control. Although FIG. 4 illustrates the high-level ECU 700 as one ECU, a plurality of high-level ECUs 700 may be provided. The control circuits 150 and 250 switch the control mode according to a command from the high-level ECU 700 or the like. The control modes include a steering assist mode in which the motor 80 is controlled according to the driver's steering torque, an automatic driving mode in which the steering angle θs is automatically controlled without driver's steering operation, and a transition mode in which the control mode is switched from one of the steering assist mode and the automatic driving mode to the other. In the following description, the steering assist mode and the automatic driving mode are referred to simply as an EPS mode and an ADS mode, respectively.

Figure 5:
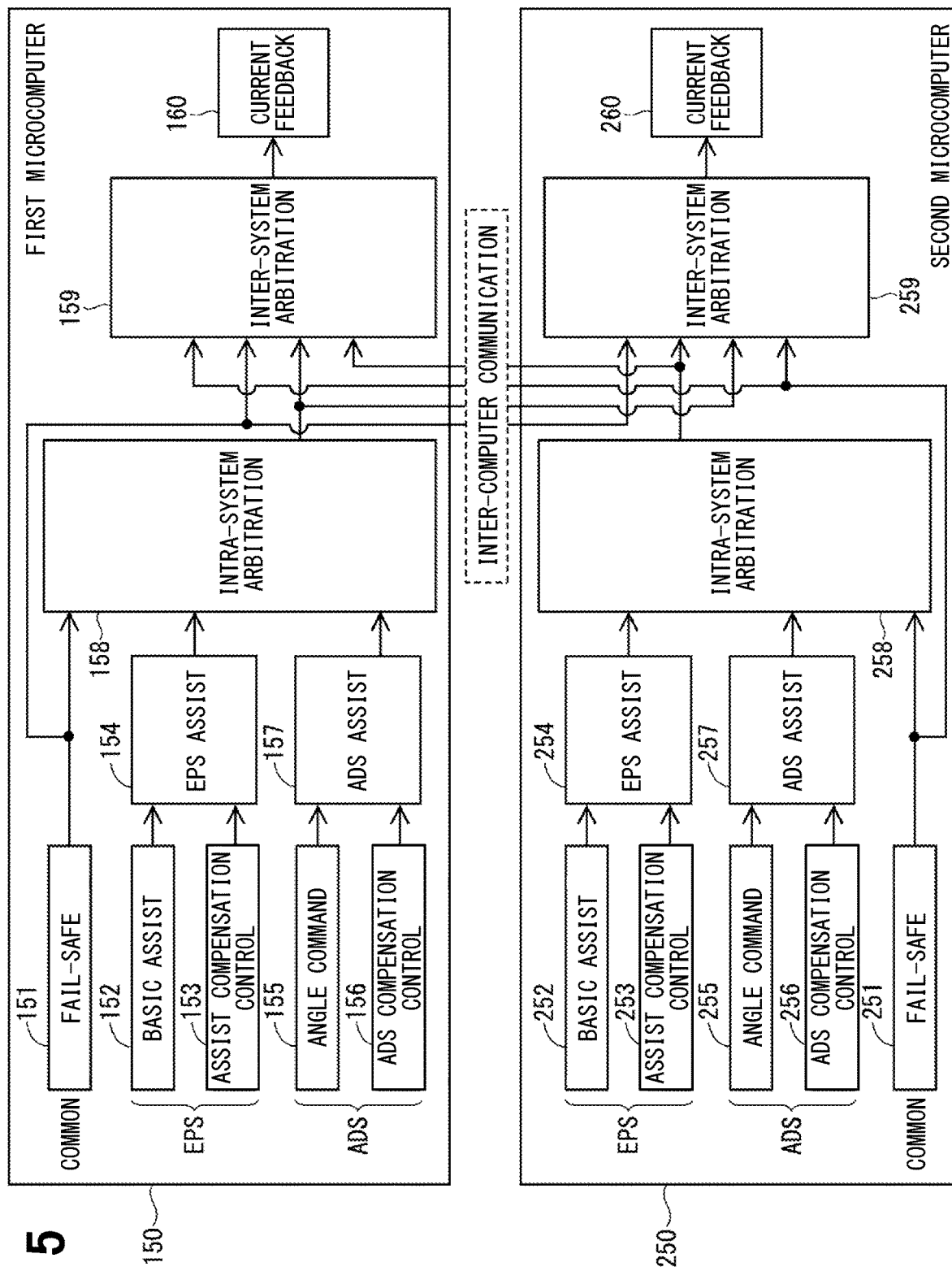
FIG. 5 is a block diagram showing first and second control circuits of the ECU in the first embodiment.

As shown in FIG. 5, the first control circuit 150 includes a fail-safe calculation section, a basic assist calculation section 152, an assist compensation control calculation section 153, an EPS assist calculation section 154, an angle command calculation section 155, an ADS compensation control calculation section 156, an ADS assist calculation section 157, an intra-system arbitration calculation section 158, an inter-system arbitration calculation section 159, a current feedback calculation section 160, and the like. Each of these sections is a function which is performed by execution of programs by the microcomputer.

The second control circuit 250 includes a fail-safe calculation section 251, a basic assist calculation section 252, an assist compensation control calculation section 253, an EPS assist calculation section 254, an angle command calculation section 255, an ADS compensation control calculation section 256, an ADS assist calculation section 257, an intra-system arbitration calculation section 258, an inter-system arbitration calculation section 259, a current feedback calculation section 260, and the like. The calculation in the second control circuit 250 is the same as that of the first control circuit 150, and hence the operation of the first control circuit 150 is described thereby simplifying the description of operation of the second control circuit 250. Each of these sections is a function which is performed by execution of programs by the microcomputer.

The fail-safe calculation section 151 monitors a failure of its own system, that is, the first system such as the inverter circuit 120. Further, the fail-safe calculation section 151 monitors a communication state with the second control circuit 250 and an operation state of the second system L2. As a method for monitoring the operation state of the second system L2, it is checked whether an emergency stop has occurred by monitoring at least one state of a circuit (for example, the second inverter circuit 220, the second power supply relay 222, and the second motor relay 225), which stops the own system when an abnormality in the second system L2 is detected, or a signal line 302. In the present embodiment, an other system relay monitoring circuit 139 is provided to acquire a second relay gate signal Vrg2 output from the second driver circuit 236 to the second power supply relay 222, and monitor the state of the second power supply relay 222 based on the second relay gate signal Vrg2. The fail-safe calculation section 151 monitors the state of the ground potential of the own system and the other system.

The monitor result of the fail-safe calculation section 151 is transmitted to the intra-system arbitration calculation section 158 of the own system and the inter-system arbitration calculation section 259 of the other system. The information transmitted to the intra-system arbitration calculation section 158 of the own system may be different from the information transmitted to the inter-system arbitration calculation section 259 of the other system, for example, by omitting some information.

The basic assist calculation section 152 calculates a basic assist command value based on a steering torque, vehicle speed and the like. The assist compensation control calculation section 153 calculates an assist compensation value for compensating the basic assist command value. The assist compensation value is, for example, a value calculated so as to reduce the NV and improve steering operation feeling. The EPS assist calculation section 154 calculates an EPS current command value I_eps1* based on the assist command value and the assist compensation value.

The angle command calculation section 155 calculates an angle command value based on the steering angle command θs* acquired from the high-level ECU 700. The ADS compensation control calculation section 156 calculates an ADS compensation value for compensating the angle command value. The ADS compensation value is a value calculated to improve, for example, the travel behavior stability of the vehicle. The ADS assist calculation section 157 calculates an ADS current command value I_ads1* based on the angle command value and the ADS compensation value.

The intra-system arbitration calculation section 158 calculates an intra-system arbitration current command value I_a1* based on the monitor result of the fail-safe calculation section 151, the EPS current command value I_eps1* and the ADS current command value I_ads1*. In the present embodiment, the first control circuit 150 uses the EPS current command value I_eps1* as the intra-system arbitration current command value I_a1* at normal time because it is used as the EPS master. The calculated intra-system arbitration current command value I_a1* is output to the inter-system arbitration calculation section 159 of the own system. The intra-system arbitration current command value I_a1* is output to the inter-system arbitration calculation section 259 of the other system by inter-computer communication between the microcomputers. Here, arbitration by using a current command value is exemplified, but arbitration may be performed by using a torque command value or a steering angle command value. In addition, in case of performing the fail-safe process based on the monitor result of the fail-safe calculation section 151, the intra-system arbitration calculation section 158 appropriately performs measures such as stopping the assist and gradually decreasing the assist.

The intra-system arbitration calculation section 258 calculates an intra-system arbitration current command value I_a2* based on the monitor result of the fail-safe calculation section 251, the EPS current command value I_eps2* and the ADS current command value I_ads2*. In the present embodiment, the second control circuit 250 uses the ADS current command value I_ads2* as the intra-system arbitration current command value I_a2* at normal time because it is used as the ADS master. The fail-safe process and the like of the second control unit 258 are the same as in the intra-system arbitration calculation section 158. Hereinafter, for the sake of simplicity, the EPS current command value I_eps1* is assumed to be output from the intra-system arbitration calculation section 158 to the inter-system arbitration calculation sections 159 and 259. Further, the ADS current command value I_ads2* is assumed to be output from the intra-system arbitration calculation section 258 to the inter-system arbitration calculation sections 159 and 259.

The inter-system arbitration calculation section 159 calculates the inter-system arbitration current command value I1* based on the intra-system arbitration current command value I_a1* of the own system, the intra-system arbitration current command value I_a2* of the other system and the monitor results of the fail-safe calculation sections 151 and 251. The inter-system arbitration calculation section 259 calculates the inter-system arbitration current command value I2* based on the intra-system arbitration current command value I_a2* of the own system, the intra-system arbitration current command value I_a1* of the other system and the monitor results of the fail-safe calculation sections 151 and 251.

Figure 6A:
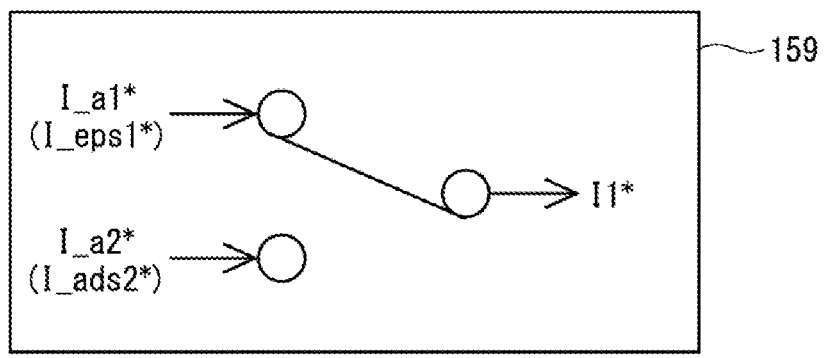
FIG. 6A, FIG. 6B and FIG. 6C are schematic diagrams illustrating configuration examples of an inter-system arbitration calculation section in the first embodiment.
Figure 6B:
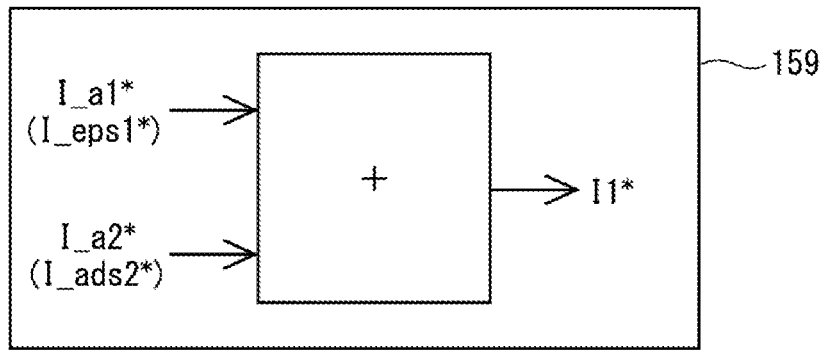
Figure 6C:
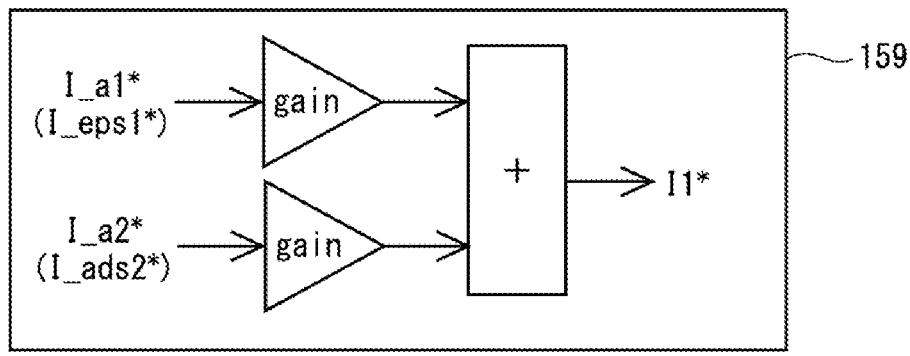

The inter-system arbitration calculation section 159 selects the EPS current command value I_eps1* or the ADS current command value I_ads2* as the inter-system arbitration current command value I1* according to the control mode, as shown in FIG. 6A. Also, for example, at the time of switching the control mode, a value obtained by adding the current command values I_eps1* and I_ads2* may be used as the inter-system arbitration current command value I1* as shown in FIG. 6B, or a value obtained by weighting the current command values I_eps1* and I_ads2* with respective gains and adding the weighted values may be used as the inter-system arbitration current command value I1* as shown in FIG. 6C.

Referring to FIG. 5 again, the current feedback calculation section 160 performs a current feedback calculation based on the inter-system arbitration current command value I1*, and generates a control signal for controlling the on/off operation of the switching elements 121.

The basic assist calculation sections 152 and 252, the assist compensation control calculation sections 153 and 253, and the EPS assist calculation sections 154 and 254 are mainly used for control calculations in the EPS mode. The angle command calculation sections 155 and 255, the ADS compensation control calculation sections 156 and 256, and the ADS assist calculation sections 157 and 257 are mainly used for control calculations in the ADS mode. The fail-safe calculation sections 151 and 251 perform common calculations in the EPS mode and the ADS mode.

In the present embodiment, the driving of the motor 80 is controlled by a master-slave method, in which a plurality of systems are controlled by sharing a command value calculated by one control circuit. Hereinafter, a control circuit that calculates a command value and a corresponding configuration are referred to simply as a master, and a control circuit that performs control using the command value received from the master and a corresponding configuration are referred to simply as a slave. By using the master-slave method, the driving of the motor 80 can be controlled in cooperation of the plurality of systems. On the other hand, in the master-slave method, the degree of dependence on the master control circuit is high, and the calculation load on the master control circuit increases. The control circuits 150 and 250 according to the present embodiment perform not only the assist control calculation for outputting an assist torque according to the driver's steering operation but also communication and arbitration between the control circuits 150 and 250, steering angle command and steering intervention from the high-level ECU 700, and the like. Thus, the calculation load tends to increase for performing more and more functions. There are restrictions on the microcomputers that can be used due to requirements such as mounting on a vehicle, security and functional safety, and hence it is desired to reduce the calculation load.

Therefore, in the present embodiment, the master in the EPS mode and the master in the ADS mode are made to be different control circuits. In the present embodiment, the first control circuit 150 is provided as a master in the EPS mode and a slave in the ADS mode. Further, the second control circuit 250 is provided to be a master in the ADS mode and a slave in the EPS mode.

The first control circuit 150 has functions of the angle command calculation section 155 that performs the command calculation in the ADS mode, the ADS compensation control calculation section 156 and the ADS assist calculation section 157. However, the first control circuit 150 limits calculations performed by the angle command calculation section 155, the ADS compensation control calculation section 156 and the ADS assist calculation section 157, in case that the second system L2 is normal and the ADS current command value I_ads2* is available. Specifically, a part or all of the calculations of the angle command calculation section 155, the ADS compensation control calculation section 156 and the ADS assist calculation section 157 may be stopped, or the calculation frequency (number of times of calculations per time) may be reduced by increasing the calculation cycle period.

The second control circuit 250 has functions of the basic assist calculation section 252 that performs the command calculation in the EPS mode, the assist compensation control calculation section 253 and the EPS assist calculation section 254. However, the second control circuit 250 limits calculations performed by the basic assist calculation section 252, the assist compensation control calculation section 253 and the EPS assist calculation section 254, in case that the first system L1 is normal and the EPS current command value I_eps1* is available. Specifically, a part or all of the calculations of the basic assist calculation section 252, the assist compensation control calculation section 253 and the EPS assist calculation section 254 may be stopped, or the calculation frequency may be reduced by increasing the calculation cycle period.

Figure 7:
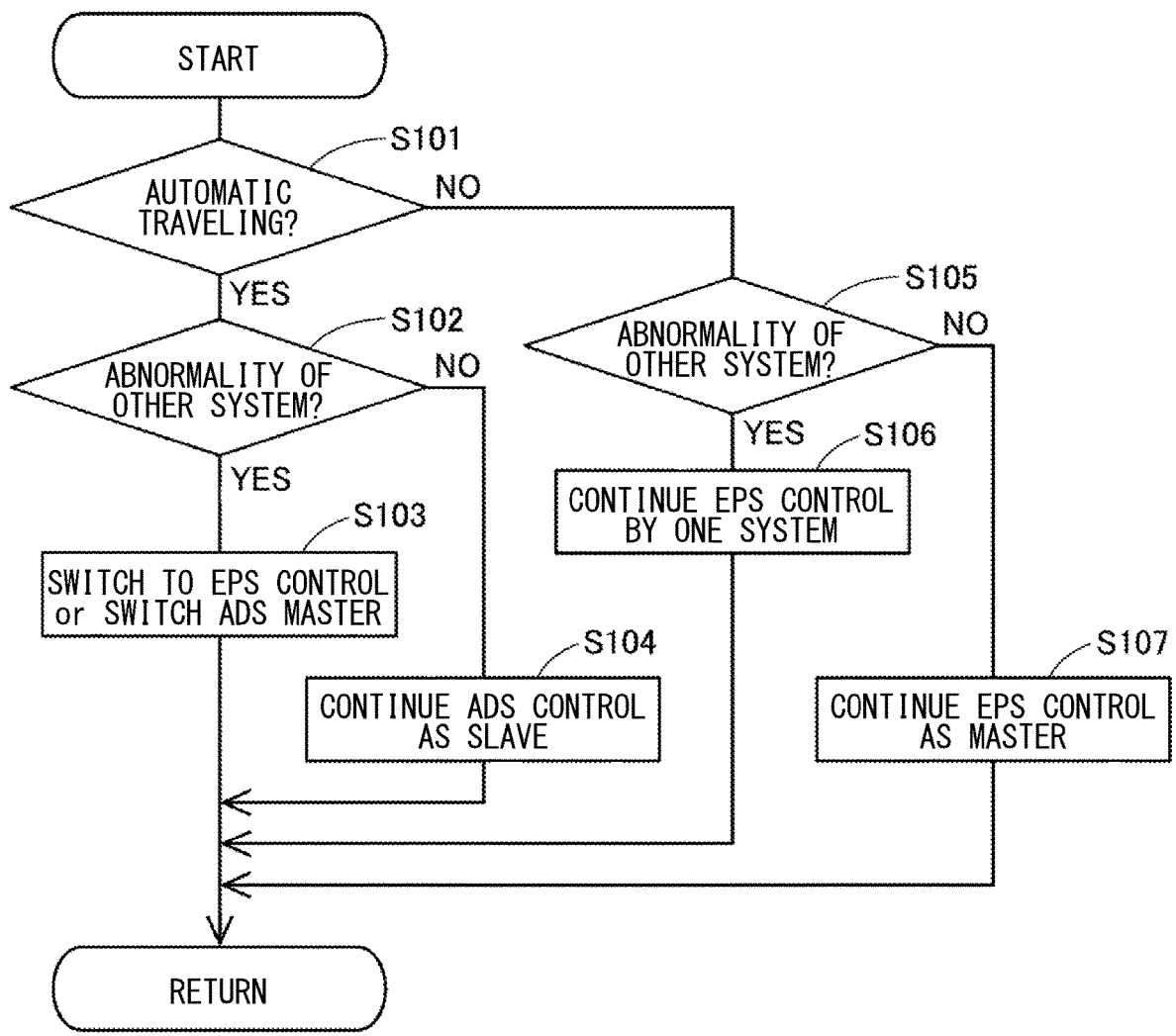
FIG. 7 is a flowchart illustrating a mode selection process performed by the first control circuit in the first embodiment.
Figure 8:
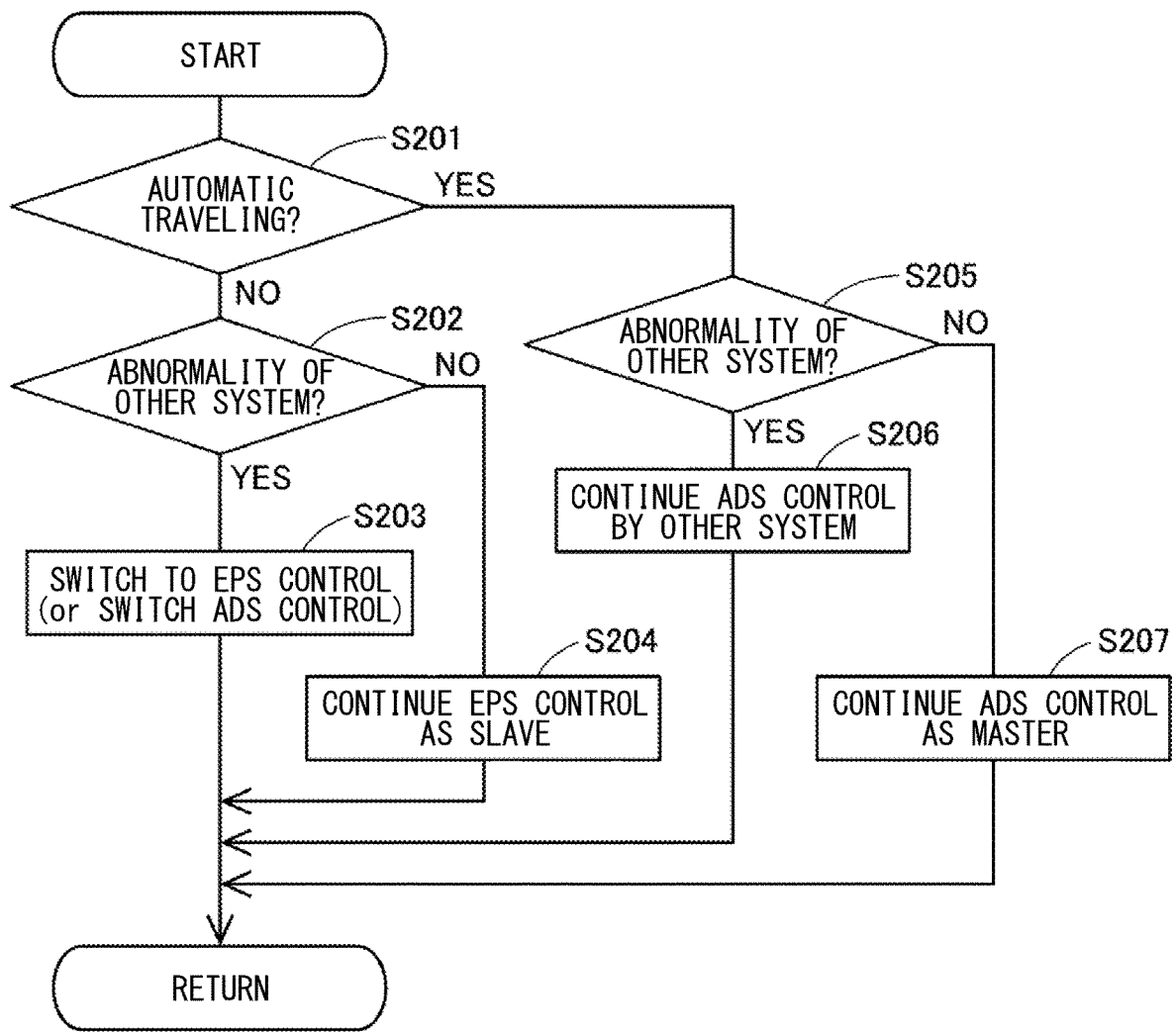
FIG. 8 is a flowchart illustrating a mode selection process performed by the second control circuit in the first embodiment.

The mode selection process of the present embodiment will be described with reference to the flowcharts of FIG. 7 and FIG. 8. FIG. 7 shows a process of the first control circuit 150, and FIG. 8 shows a process of the second control circuit 250. These processes are performed at a predetermined cycle period when the own system is normal. Hereinafter, "step" is simply indicated as a symbol S.

The process in the first control circuit 150 that is the EPS master and the ADS slave will be described with reference to FIG. 7. In S101, the first control circuit 150 checks whether the automatic driving is being performed. Here, a driving support may be included in the concept of automatic driving, and an affirmative determination (YES) may be made. The same applies to S201. In case it is determined that the automatic driving is not being performed (S101: NO), the process proceeds to S105. In case it is determined that the automatic driving is being performed (S101: YES), the process proceeds to S102.

In S102, the first control circuit 150 checks whether the other system is abnormal because of a certain failure. In case it is determined that the other system is abnormal (S102: YES), the process proceeds to S103. In case it is determined that the other system is normal and not abnormal (S102: NO), the process proceeds to S104.

In S103, the first control circuit 150 switches the control mode from the ADS mode to the EPS mode. In this case, the driving of the motor 80 is controlled using the EPS current command value I_eps1*. Alternatively, the first control circuit 150 may continue the ADS control as the ADS master. In this case, the driving of the motor 80 is controlled using the ADS current command value I_ads1*. In case the first control circuit 150 is the ADS master, the first control circuit 150 becomes the master of the EPS mode and the ADS mode, and the calculation load increases. For this reason, the calculation load may be limited by stopping or increasing the calculation cycle period of calculations performed by at least a part of calculation sections (for example, the assist compensation control calculation section 153 and the ADS compensation control calculation section 156).

In S104, the first control circuit 150 continues the ADS mode as the ADS slave. In this case, the first control circuit 150 controls the driving of the motor 80 using the ADS current command value I_ads2* transmitted from the second control circuit 250.

In case it is determined that the automatic driving is not being performed (S101: NO), the first control circuit 150 checks in S105, whether the other system is abnormal. In case it is determined that the other system is abnormal (S105: YES), the process proceeds to S106. In case it is determined that the other system is normal (S105: NO), the process proceeds to S107.

In S106, the first control circuit 150 continues the EPS mode by single-system driving using the EPS current command value I_eps1*. In case there are a plurality of EPS slaves, the EPS mode is continued in the plurality of systems excluding the abnormal system. In S107, the first control circuit 150 transmits as the EPS master the EPS current command value I_eps1* to the second control circuit 250, and continues the EPS mode using the EPS current command value I_eps1*.

The process in the second control circuit 250 that is the EPS slave will be described with reference to FIG. 8. In S201, the second control circuit 250 checks whether the automatic driving is being performed. In case it is determined that the vehicle is in the automatic driving operation (S201: YES), the process proceeds to S205. In case it is determined that the vehicle is not in the automatic driving operation (S201: NO), the process proceeds to S202.

In S202, the second control circuit 250 checks whether the other system is abnormal. In case it is determined that the other system is abnormal (S202: YES), the process proceeds to S203. In case it is determined that the other system is normal (S202: NO), the process proceeds to S204.

In S203, the second control circuit 250 continues the EPS mode as the EPS master itself. In this case, the driving of the motor 80 is controlled using the EPS current command value I_eps2*. Further, the control mode may be switched from the EPS mode to the ADS mode, and the driving of the motor 80 may be controlled using the ADS current command value I_ads2*. Under current traffic regulations in some countries, for example, in Japan, it is not permitted to switch to the automatic driving operation at the discretion of the vehicle. However, it may be made possible to be applied in case switching to the automatic driving is made possible to automatically stop at a shoulder of a road at the discretion of the vehicle when the driver becomes fainted, for example.

In S204, the second control circuit 250 continues the EPS mode as the EPS slave. In this case, the second control circuit 250 controls the driving of the motor 80 using the EPS current command value I_eps1* transmitted from the first control circuit 150.

In case it is determined that the automatic driving is being performed (S201: YES), the second control circuit 250 checks in S205 whether the other system is abnormal. In case it is determined that the other system is abnormal (S205: YES), the process proceeds to S206. In case it is determined that the other system is normal (S205: NO), the process proceeds to S207.

In S206, the second control circuit 250 continues the ADS mode by one-system driving using the ADS current command value I_ads2*. In case there is a plurality of ADS slaves, the ADS mode is continued in a plurality of systems excluding the abnormal system. In S207, the second control circuit 250 transmits as the ADS master the ADS current command value I_ads2* to the first control circuit 150, and continues the ADS mode using the ADS current command value I_ads2*.

Figure 9:
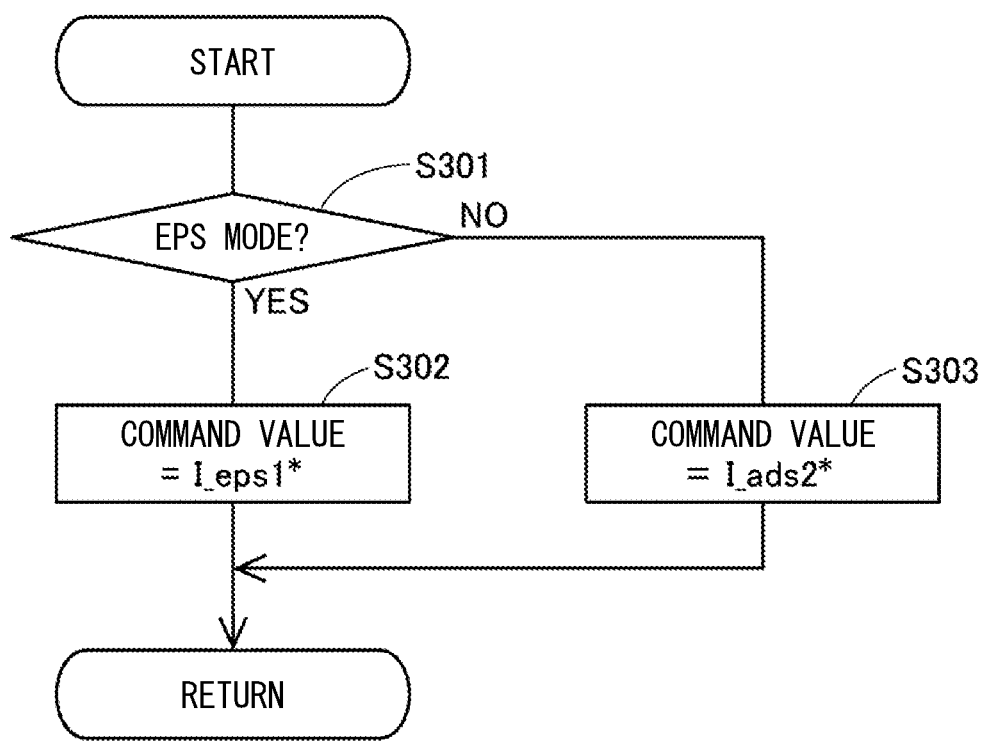
FIG. 9 is a flowchart illustrating a mode switching process performed in the first embodiment.

The mode switching process will be described with reference to the flowchart of FIG. 9. This process is performed by each of the control circuits 150 and 250. It is assumed here that both systems L1 and L2 are normal. In the present embodiment, the control mode is selected in the control circuits 150 and 250. However, for example, the control mode may be selected by an external control unit such as the high-level ECU 700, and the EPS mode and the ADS mode may be switched based on a mode command acquired from an external side.

In S301, the control circuit 150, 250 checks whether the control mode is the EPS mode. In case it is determined that the control mode is the EPS mode (S301: YES), the process proceeds to S302, and the control circuit 150, 250 selects the EPS current command value I_eps1* as the current command value I1*, I2*. In case it is determined that the control mode is the ADS mode (S301: NO), the process proceeds to S303. The control circuit 150, 250 selects the ADS current command value I_ads2* as the current command value I1*, I2*.

As described above, the ECU 10 is configured to control the driving of the motor 80, and includes a plurality of control circuits 150 and 250 that can communicate with each other. The control circuits 150 and 250 are configured to be able to switch the control modes including the ADS mode for controlling the driving of the motor 80 based on the steering angle command θs* and the torque control mode for controlling the driving of the motor 80 based on the torque command value.

In the present embodiment, the first control circuit 150 is configured to calculate the EPS current command value I_eps1* shared by the plurality of control circuits 150 and 250 in the EPS mode, and the second control circuit 250 is configured to calculate the ADS current command value I_ads2* shared by the plurality of circuits 150 and 250 in the ADS mode. That is, the control circuit 150 that calculates the EPS current command value I_eps1* that is the master torque control command value is different from the control circuit 250 that calculates the ADS current command value I_ads2* that is the master angle control command value. That is, the master torque control circuit and the master angle control circuit are configured by different control circuits 150 and 250.

In the present embodiment, by setting the first control circuit 150 as the EPS master and the second control circuit 250 as the ADS master, the calculation load can be reduced as compared with the case where the same control circuit serves as the EPS master and the ADS master. Here, the master torque control circuit and the master angle control circuit are made different by configuring the master torque control circuit and the master angle control circuit by different microcomputers, that is, by different ECUs, or by separating the functions of the CPU and the like to be clearly independent from each other even in case of a single packaged form. In the present embodiment, the first control circuit 150 as the master torque control circuit and the second control circuit 250 as the master angle control circuit are configured by different microcomputers.

The second control circuit 250 is configured to be able to calculate the EPS current command value I_eps2*, and perform the EPS mode using the EPS current command value I_eps2* even in case of an occurrence of abnormality in the first system L1. Thus, even in case that an abnormality occurs in the EPS master system (first system L1 in the present embodiment), the driving control of the motor 80 can be performed in the EPS mode.

The second control circuit 250 is configured to limit the calculation of the EPS current command value I_eps2* in case that the EPS current command value I_eps1* is available. This makes it possible to reduce the calculation load of the second control circuit 250 that is the ADS master.

The first control circuit 150 is configured to be able to calculate the ADS current command value I_ads1*, and perform the ADS mode using the ADS current command value I_ads1* even in case of an occurrence of abnormality in the second system L2. Thus, even in case that the abnormality occurs in the ADS master system (second system L2 in the present embodiment), the driving control of the motor 80 can be performed in the ADS mode.

The first control circuit 150 is configured to limit the calculation of the ADS current command value I_ads2* in case that the ADS current command value I_ads2* is available. This makes it possible to reduce the calculation load of the first control circuit 150 that is the EPS master.

In case at least one of the EPS master system and the ADS master system is abnormal and the command value calculated by one control circuit is used in the EPS mode and the ADS mode, a part of the calculation in such a control circuit is limited. For example, a calculation cycle period other than those of the steering angle feedback control, the steering cooperative control and the current feedback control is increased. Thereby, even when one control circuit carries the EPS master and the ADS master, it is possible to suppress an increase in the calculation load.

The second control circuit 250 is configured to use the EPS current command value I_eps1* and an integration value which have been calculated by the first control circuit 150 before the occurrence of abnormality and calculate subsequent EPS current command value I_eps2* in case of the occurrence of abnormality in the first control circuit 150 and the switching of the EPS master to the second control circuit 250. In this case, the first control circuit 150 corresponds to a pre-switching control circuit, that is, a control circuit before switching, and the second control circuit 250 corresponds to a post-switching control circuit, that is, a control circuit after switching.

The first control circuit 150 is configured to use the ADS current command value I_ads2* and the integration value which have been calculated by the second control unit 152 before the occurrence of abnormality and calculate a subsequent ADS current command value I_ads1* in case of the occurrence of abnormality in the second control circuit 150 and the switching of the ADS master to the first control circuit 150. In this case, the second control circuit 250 corresponds to the pre-switching control circuit, that is, a control circuit before switching, and the first control circuit 150 corresponds to the post-switching control unit, that is, a control circuit after switching. Thereby, even in case that the calculation on the slave side is restricted before the occurrence of abnormality, the command calculation can be appropriately shifted from the master side to the slave side.

Second Embodiment

Figure 10:
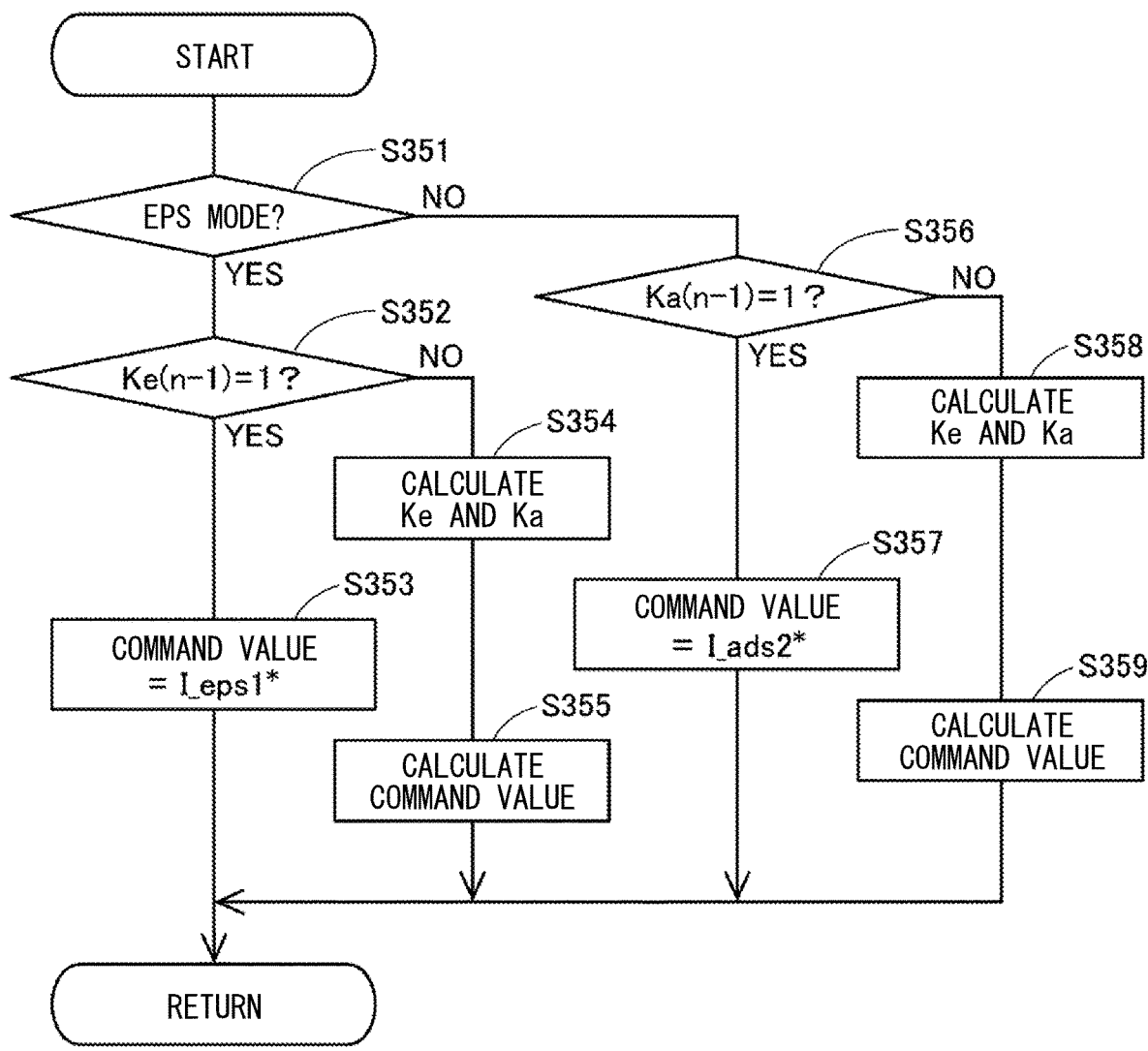
FIG. 10 is a flowchart illustrating a mode switching process performed in a second embodiment.

A second embodiment is shown in FIG. 10. In the present embodiment, the mode switching process is different from that of the first embodiment and hence described below. In the present embodiment, the inter-system arbitration calculation sections 159 and 259 are configured as shown in FIG. 6C, and the EPS mode and the ADS mode are switched gradually at the time of switching the mode.

The mode switching process will be described with reference to the flowchart of FIG. 10. Hereinafter, a previous value is indicated by using (n−1) and a current value is indicated by using (n). S351 is the same as step S301 in FIG. 9. In S352, which is performed when the control mode is the EPS mode (S351: YES), the control circuits 150, 250 checks whether a previous value Ke(n−1) of an EPS gain Ke is 1. In case it is determined that the previous value of the EPS gain Ke is 1 (S352: YES), the process proceeds to S353, and the control circuit 150, 250 continues the EPS mode by setting the current command value I1*, I2* to the EPS current command value I_eps1*. In case it is determined that the previous value of the EPS gain Ke is not 1 (S352: NO), the process proceeds to S354.

In S354, the control circuits 150 and 250 calculate the EPS gain Ke and the ADS gain Ka (see equations (1) and (2)) so as to increase the EPS gain Ke and decrease the ADS gain Ka. Assuming that α1 in the equations is constant, the gains increase and decrease linearly. Further, α1 may be set so as to increase or decrease the gain nonlinearly, or an LPF or the like may be used. Further, the gains Ke and Ka are not less than 0 and not more than 1 so that the sum is 1. In case the gains Ke and Ka are larger than 1, they are set limitedly to 1. In case the gains Ke and Ka are smaller than 0, they are set limitedly to 0. The gains Ke and Ka are set in the same way in S358. In S355, the control circuits 150 and 250 calculate the current command values I1* and I2* using the EPS gain Ke and the ADS gain Ka (see Equation (3)).

$$Ke(n)=Ke(n-1)+\alpha 1 \quad (1)$$

$$Ka(n)=Ka(n-1)-\alpha 1 \quad (2)$$

$$I1^*=I2^*=Ke\times I\_eps1^*+Ka\times I\_ads2^* \quad (3)$$

In S356, which is performed when the control mode is not the EPS mode but is the ADS mode, the control circuits 150 and 250 check whether the previous value Ka(n−1) of the ADS gain Ka is 1. In case it is determined that the previous value of the ADS gain Ka is 1 (S356: YES), the process proceeds to S357. The control circuits 150 and 250 set the current command values I1* and I2* to the ADS current command value I_ads2* and continue the ADS mode. In case it is determined that the previous value Ka(n−1) of the ADS gain Ka is not 1 (S356: NO), the process proceeds to S358.

In S358, the control circuits 150 and 250 calculate the EPS gain Ke and the ADS gain Ka (see equations (4) and (5)) so as to decrease the EPS gain Ke and increase the ADS gain Ka. It is to be noted that α2 in the equations may be the same as or different from α1. S359 is performed similarly to S355.

$$Ke=Ke(n-1)-\alpha 1 \quad (4)$$

$$Ka(n)=Ka(n-1)+\alpha 1 \quad (5)$$

In the present embodiment, since the EPS mode and the ADS mode are gradually switched, it is possible to prevent a sudden change in torque or the like due to switching of the control mode. The second embodiment also provides the same advantage as that of the first embodiment.

Third Embodiment

A third embodiment is shown in FIG. 11 to FIG. 14. In the present embodiment, details of the mode switching performed according to an abnormal location will be described. When switching the control mode between the EPS mode and the ADS mode, the switching may be performed promptly as in the first embodiment or may be performed gradually as in the second embodiment.

Figure 11:
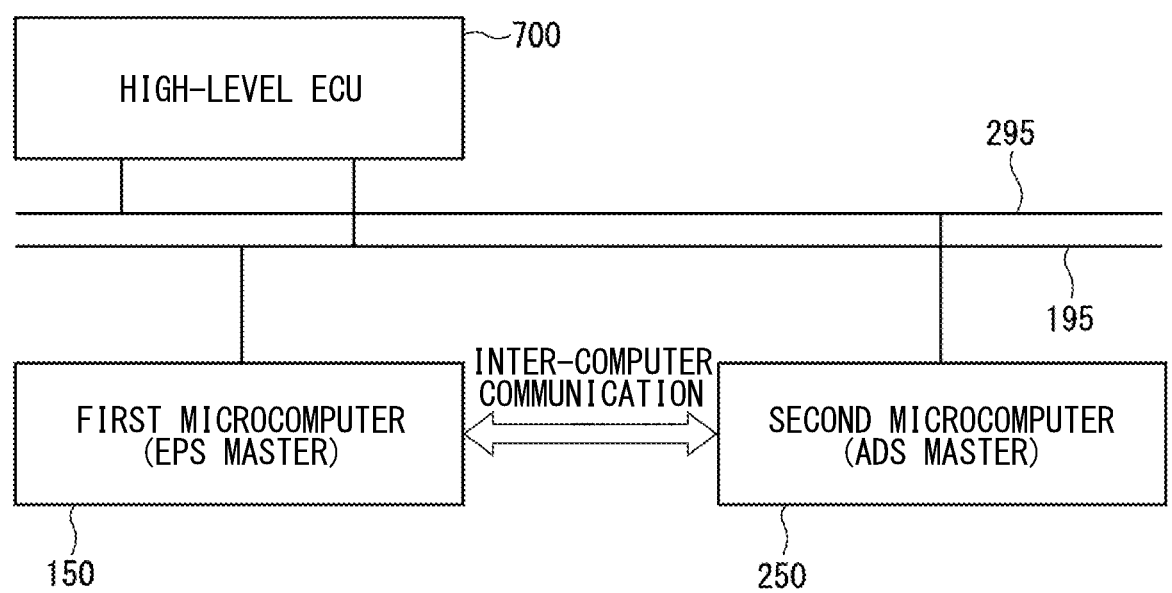
FIG. 11 is a schematic diagram showing communication performed between first and second control circuits and a high-level ECU in a third embodiment.

As shown in FIG. 11, in the present embodiment, the control circuits 150 and 250 transmit and receive information to and from the high-level ECU 700 via the vehicle communication networks 195 and 295, respectively. The control circuits 150 and 250 transmit and receive information by the inter-computer communication between the microcomputers. Here, FIG. 12 shows an abnormal state measure performed at the time of an occurrence of communication abnormality.

Hereinafter, the communication between the first control circuit 150 as the EPS master and the high-level ECU 700 is referred to as (C1) EPS master/high-level ECU, the communication between the second control circuit 250 as the ADS master and the high-level ECU 700 is referred to as (C2) ADS master/high-level ECU, and the inter-computer communication between the control circuits 150 and 250 is referred to as (C3) inter-computer communication. Normal state (no abnormal state) and abnormal state are indicated as O and X, respectively.

In case all communications (C1), (C2) and (C3) are normal, an abnormal time process is not performed. In case the control mode is the EPS mode, the driving of the motor 80 is controlled using the EPS current command value I_eps1*. In case the control mode is the ADS mode, the driving of the motor 80 is controlled using the ADS current command value I_ads2*. In case both communications (C1) and (C2) are abnormal, that is, in case that both of the control circuits 150 and 250 cannot communicate normally with the high-level ECU 700, the driving of the motor 80 is stopped regardless of whether there is an abnormality in the inter-computer communication.

An operation performed in case the control mode is the EPS mode will be described below. In case that the communication between the control circuits 150 and 250 and the high-level ECU 700 is normal and the inter-computer communication is abnormal, the operation is shifted to the independent driving as a measure at the time of occurrence of abnormality. The first control circuit 150 and the second control circuit 250 control the driving of the motor 80 by using the EPS current command value I_eps1* and the EPS current command value I_eps2*, respectively.

In case that the communication between one of the control circuits 150 and 250 and the high-level ECU 700 is normal and the communication between the other of the control circuits 150 and 250 and the high-level ECU 700 is abnormal, the EPS mode is continued without starting the ADS mode.

In case that the communication between the first control circuit 150 and the high-level ECU 700 and the inter-computer communication are normal, and the communication between the second control circuit 250 and the high-level ECU 700 is abnormal, the ADS mode may be implemented by transmitting from the first control circuit 150 to the second control circuit 250 the information, which the first control circuit 150 received from the high-level ECU 700, by communication between the microcomputers. Alternatively, the first control circuit 150 may be switched to the ADS master to perform the ADS mode.

In case the communication between the first control circuit 150 and the high-level ECU 700 is abnormal and the communication between the second control circuit 250 and the high-level ECU 700 and the inter-computer communication are normal, the ADS mode may be performed by transmitting necessary information from the second control circuit 250 to the first control circuit 150 through the inter-computer communication.

An operation performed in case the control mode is the ADS mode will be described next. In case the communication between the control circuits 150 and 250 and the high-level ECU 700 is normal and the inter-computer communication is abnormal, the ADS mode is continued in the independent driving manner as a measure at the time of abnormality. That is, the first control circuit 150 controls the driving of the motor 80 using the ADS current command value I_ads1*, and the second control unit 20 controls the driving of the motor 80 using the ADS current command value I_ads2*.

In case the communication between the first control circuit 150 and the high-level ECU 700 is normal and the communication between the second control circuit 250 and the high-level ECU 700 is abnormal, the ADS mode is stopped and the mode is shifted to the EPS mode. At this time, the driving control of the motor 80 by the coordinated driving can be performed in case the inter-computer communication is normal. However, the driving of the motor 80 is controlled by the independent driving or the single-system driving in case the inter-computer communication is abnormal. As far as the inter-computer communication is normal, the first control circuit 150 may be switched to the ADS master to continue the ADS mode.

In case the communication between the first control circuit 150 and the high-level ECU 700 is abnormal and the communication between the second control circuit 250 and the high-level ECU 700 is normal, the first system L1, which is a main system, is stopped and the ADS mode is continued by the second system L2, which is a sub-system. In case the inter-computer communication is normal, the ADS mode may be continued by both systems by transmitting necessary information from the second control circuit 250 to the first control circuit 150 via the inter-computer communication.

FIG. 13 shows an abnormal state measure when a command calculation abnormality occurs. In FIG. 13, the command calculation in the first control circuit 150 is referred to as (E1) EPS master command calculation, and the command calculation in the second control circuit 250 is referred to as (E2) ADS master command calculation. In the present embodiment, the fail-safe calculation section 151, the basic assist calculation section 152, the assist compensation control calculation section 153, the EPS assist calculation section 154, the angle command calculation section 155, the ADS compensation control calculation section 156, the ADS assist calculation section 157, the intra-system arbitration calculation section 158, the inter-system arbitration calculation section 159 and the current feedback calculation section 160 are functional blocks that configure a command calculation in the first control circuit 150. Further, the fail-safe calculation section 251, the basic assist calculation section 252, an assist compensation control calculation section 253, the EPS assist calculation section 254, the angle command calculation section 255, the ADS compensation control calculation section 256, the ADS assist calculation section 257, the intra-system arbitration calculation section 258, the inter-system arbitration calculation section 259 and the current feedback calculation section 260 are functional blocks that configure the command calculation in the second control circuit 250. Here, it is assumed that the control circuits 150 and 250 are normal except for the command calculation.

In case both of the command calculations of the control circuits 150 and 250 and the inter-computer communication are normal, the abnormal time process is not performed. In case the control mode is the EPS mode, the driving of the motor 80 is controlled using the EPS current command value I_eps1*. In case the control mode is the ADS mode, the driving of the motor 80 is controlled using the ADS current command value I_ads2*. Further, in case a command calculation abnormality occurs in both of the control circuits 150 and 250, the driving of the motor 80 is stopped and the assist is stopped regardless of the presence or absence of the abnormality in the inter-computer communication.

An operation performed in case the control mode is the EPS mode will be described below. In case the command calculations in the control circuits 150 and 250 are normal and the inter-computer communication is abnormal, the first control circuit 150 and the second control circuit 250 operate to drive the motor 80 in the independent driving mode by using the EPS current command value I_eps1* and using the EPS current command value I_eps2*, respectively.

In case the command calculation of the first control circuit 150 is normal and the command calculation of the second control circuit 250 is abnormal, the EPS mode is continued by the single-system driving by using the first system L1. In case the command calculation of the second control circuit 250 is normal and the command calculation of the first control circuit 150 is abnormal, the EPS mode is continued by the single-system driving by using the second system L2.

In case the command calculation of the first control circuit 150 is normal, the command calculation of the second control circuit 250 is abnormal, and the inter-computer communication is normal, the motor driving by the two systems may be continued by transmitting the EPS current command value I_eps1* calculated by the first control circuit 150 to the second control circuit 250 and using the EPS current command value I_eps1*. In case the command calculation of the first control circuit 150 is abnormal, the command calculation of the second control circuit 250 is normal, and the inter-computer communication is normal, the motor diving by the two systems may be continued by transmitting the EPS current command value I_eps2* calculated by the second control circuit 250 to the first control circuit 150 and using the EPS current command value I_eps2*.

An operation performed in case the control mode is the ADS mode will be described next. In case the command calculations in the control circuits 150 and 250 are normal and the inter-computer communication is abnormal, the first control circuit 150 and the second control circuit 250 continue the ADS mode in the independent driving mode by using the ADS current command value I_ads1* and using the ADS current command value I_ads2*, respectively.

In case the command calculation of the first control circuit 150 is normal and the command calculation of the second control circuit 250 is abnormal, the ADS mode is stopped and the mode is shifted to the EPS mode. At this time, as far as the inter-computer communication is normal, the first control circuit 150 may be switched to the ADS master to continue the ADS mode.

In case the command calculation of the first control circuit 150 is abnormal and the command calculation of the second control circuit 250 is normal, the first system L1 is stopped, and the ADS mode is continued by the second system L2. In case the inter-computer communication is normal, the ADS mode may be continued by both systems by transmitting necessary information from the second control circuit 250 to the first control circuit 150 via the inter-computer communication.

FIG. 14 shows an abnormal time process performed when an abnormality occurs in the driving system. In the present embodiment, the driving system includes the inverter circuit 120, 220 and the motor winding 180, 280, that is, various components forming a motor current supply path that supplies a current to the motor winding 180, 280. The driving system of the first system L1 is referred to as (D1) EPS master driving system and the driving system of the second system L2 is referred to as (D2) ADS master driving system.

In case the driving system of the first system L1, the driving system of the second system L2 and the inter-computer communication are all normal, the abnormal time process is not performed. In case the control mode is the EPS mode, the driving of the motor 80 is controlled using the EPS current command value I_eps1*. In case the control mode is the ADS mode, the driving of the motor 80 is controlled using the ADS current command value I_ads2*. Further, in case the driving systems of the systems L1 and L2 are both abnormal, the driving of the motor 80 is stopped and the assist operation is stopped regardless of the presence or absence of the abnormality in the inter-computer communication.

An operation performed in case the control mode is the EPS mode will be described below. In case the driving systems of the systems L1 and L2 are normal and the inter-computer communication is abnormal, the first control circuit 150 and the second control circuit 250 operate to control the driving of the motor 80 in the independent driving mode by using the EPS current command value I_eps1* and using the EPS current command value I_eps2*, respectively.

In case the driving system of the first system L1 is normal and the driving system of the second system L2 is abnormal, the EPS mode is continued by the single-system driving using the first system L1. In case the driving system of the first system L1 is abnormal and the driving system of the second system L2 is normal, the EPS mode is continued by the single-system driving using the second system L2.

An operation performed in case the control mode is the ADS mode will be described next. In case the driving systems of the systems L1 and L2 are normal and the inter-computer communication is abnormal, the first control circuit 150 and the second control circuit 250 continue the ADS mode in the independent driving mode by using the ADS current command value I_ads1* and using the ADS current command value I_ads2*, respectively.

In case the driving system of the first system L1 is normal and the driving system of the second system L2 is abnormal, the ADS mode is stopped, and the mode is shifted to the EPS mode. In this mode, the driving of the motor 80 is controlled by the single system driving of the first system L1. Further, the first control circuit 150 may be switched to the ADS master, and the ADS mode may be continued by the single-system driving of the first system L1. In case the driving system of the first system L1 is abnormal and the driving system of the second system L2 is normal, the ADS mode is continued by the single-system driving of the second system L2.

In the present embodiment, different measures are taken depending on the location of occurrence of abnormality and the control mode, that is, whether the control mode at the time of the occurrence of abnormality is the EPS mode or the ADS mode. As a result, it is possible to select an appropriate abnormality measure in accordance with the situation of occurrence of abnormality.

The control circuits 150 and 250 acquire the steering angle command θs* from the high-level ECU 700. In case an abnormality occurs in communication between the high-level ECU 700 and some of the control circuits 150 and 250 in the EPS mode, the mode shifting to the ADS mode is prohibited and the EPS mode is continued. In addition, in case an abnormality occurs in the communication between the high-level ECU 700 and the second control circuit 250 that is the ADS master in the ADS mode, the ADS mode is stopped and the mode is shifted to the EPS mode. In case an abnormality occurs in the communication between the high-level ECU 700 and the first control circuit 150 that is the ADS slave, the ADS mode is continued using the second system L2. Thus, even in case an abnormality occurs in the communication with the high-level ECU 700, the driving control of the motor 80 can be appropriately continued.

In case a command calculation abnormality occurs in some of the control circuits 150 and 250 in the EPS mode, the driving of the motor 80 is continued using a system, which is capable of performing a command calculation normally. In this case, the transition to the ADS mode may be prohibited or the transition to the ADS mode may be permitted. In case a command calculation abnormality occurs in the second control circuit 250 in the ADS mode, the ADS mode is stopped and the mode is shifted to the EPS mode. In case the command calculation abnormality occurs in the first control circuit 150, the ADS mode is continued using the second system L2. Thus, even in case the command calculation abnormality occurs, the driving control of the motor 80 can be appropriately continued.

In the EPS mode, when an abnormality occurs in a part of the driving system, the driving of the motor 80 is continued using the system corresponding to the normal driving system. In this case, the transition to the ADS mode may be prohibited or the transition to the ADS mode may be permitted. In case an abnormality occurs in the driving system of the second system L2 in the ADS mode, the ADS mode is stopped and the mode is shifted to the EPS mode of the first system L1. In case an abnormality occurs in the driving system of the first system L1, the ADS mode is continued in the second system L2. Accordingly, even in case the abnormality occurs in a part of the driving system, the driving control for the motor 80 can be appropriately continued.

In case an error occurs in the inter-computer communication in the EPS mode, the command value is not shared and the EPS mode is continued by the independent driving. If an error occurs in the communication between microcomputers during the ADS mode, the ADS mode is continued by independent driving. In the independent driving, the driving of the motor 80 is controlled using the command value calculated by the control circuit of the own system without using the information supplied from the control circuit of the other system. As a result, even in case the abnormality occurs in the inter-computer communication, the driving control of the motor 80 can be appropriately continued by the independent control.

In the above embodiments, the ECU 10 corresponds to the rotary electric machine control device, the motor 80 corresponds to the rotary electric machine, the motor windings 180 and 280 correspond to the windings, and the high-level ECU 700 corresponds to the external control device. The EPS mode corresponds to the torque control mode, the ADS mode corresponds to the angle control mode, and the steering angle command θs* corresponds to the angle command value.

The first control circuit 150 corresponds to the master torque control circuit and the slave angle control circuit. The EPS current command value I_eps1* corresponds to the master torque control command value, and the ADS current command value I_ads1* corresponds to the slave angle control command value.

The second control circuit 250 corresponds to the master angle control circuit and the slave angle control circuit. The ADS current command value I_ads2* corresponds to the master angle control command value, and the EPS current command value I_ads2* corresponds to the slave torque control command value.

Limiting the operation includes stopping at least a part of the calculation and reducing the calculation frequency by increasing the calculation cycle period, so that the calculation load is decreased. For example, in the calculation of the EPS current command value I_eps2*, limiting the calculation is performed by stopping the calculation of the EPS current command value I_eps2* itself, stopping a part of the calculation of the EPS current command value I_eps2*, for example, stopping only the assist compensation value, or increasing the calculation cycle period. Of course, the calculation cycle period may be increased for those that continue the calculation while stopping a part of the calculation which is other than the calculation to be continued, only a part of the calculation may be stopped without changing the calculation cycle period, or the calculation cycle period may be increased while performing all calculations. Calculation of other values may be limited similarly as exemplified above in reference to the EPS current command value.

Other Embodiment

In the above embodiments, the ADS mode corresponds to the angle control mode, and the EPS mode corresponds to the torque control mode. In another embodiment, the angle control mode is not limited to the ADS mode, but may be any control that drives the motor based on the angle command value. Further, the torque control mode is not limited to the EPS mode, but may be any control that controls the driving of the motor based on the torque command value.

In the above embodiments, two control circuits are provided. In another embodiment, three or more control circuits may be provided. In this case, a first control circuit is configured to perform the master torque control and the slave angle control, a second control circuit is configured to perform the master angle control and the slave torque control, and a third control circuit is configured to perform the slave torque control and the slave angle control. In case of three or more systems, a system other than the ADS master system may operate as the EPS master system to continue the controls by a plurality of systems when the EPS master system becomes abnormal. Similarly, a system other than the EPS master system may operate as the ADS master system to continue the controls by a plurality of systems when the ADS master system becomes abnormal.

In the above embodiments, two motor windings and two inverter circuits are provided. In another embodiment, the motor winding and the inverter circuit may be one, three or more. Further, for example, one control circuit may be provided for a plurality of motor windings and inverter circuits, or a plurality of inverter circuits and motor windings may be provided for one control circuit. That is, the numbers of motor windings, inverter circuits and control circuits may be different. In the above embodiments, the power supply is provided for each system, and the ground of each system is separated. In another embodiment, one power supply may be shared by a plurality of systems. Further, a plurality of systems may be connected to the common ground.

In the above embodiments, the rotary electric machine is the three-phase brushless motor. In another embodiment, the rotary electric machine is not limited to the brushless motor, but may be any motor, and may be a motor-generator having both functions of a motor and a generator. In the above embodiments, the rotary electric machine control device is applied to the electric power steering device. In another embodiment, the rotary electric machine control device may be applied to a device such as a steer-by-wire device or the like, which is other than the electric power steering device for steering control.

The control circuit and method described in the present disclosure may be implemented by a special purpose computer, which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the above embodiment, and various modifications may be implemented without departing from the spirit of the present disclosure.

What is claimed is:

1. A rotary electric machine control device for controlling driving of a rotary electric machine, the rotary electric machine control device comprising:
   a plurality of control circuits configured to communicate mutually and switch a control mode including an angle control mode and a torque control mode, which control the driving of the rotary electric machine based on an angle command value and a torque command value, respectively, wherein:
   the plurality of control circuits includes a master torque control section, which is configured to calculate a master torque control command value shared by the plurality of control circuits in the torque control mode, and a master angle control section, which is configured to calculate a master angle control command value shared by the plurality of control circuits in the angle control mode; and
   the master torque control section and the master angle control section are provided in different control circuits of the plurality of control circuits, wherein:
   the plurality of control circuits is configured to differentiate an abnormal time measure depending on a location of an occurrence of abnormality and whether the control mode at the time of the occurrence of abnormality is the torque control mode and the angle control mode.

2. The rotary electric machine control device according to claim 1, wherein:
   the plurality of control circuits further includes a slave torque control section provided in a control circuit of the plurality of control circuits, which is other than the control circuit including the master torque control section, the slave torque control section being configured to calculate a slave torque control command value in the torque control mode and perform the torque control mode by using the slave torque control command value at time of an occurrence of abnormality in a system corresponding to the master torque control section.

3. The rotary electric machine control device according to claim 2, wherein:
the slave torque control section is configured to limit a calculation of the slave torque control command value in case that the master torque control command value is available.

4. The rotary electric machine control device according to claim 1, wherein:
the plurality of control circuits further includes a slave angle control section provided in a control circuit of the plurality of control circuits, which is other than the control circuit including the master angle control section, the slave angle control section being configured to calculate a slave angle control command value in the angle control mode and perform the angle control mode by using the slave angle control command value at time of an occurrence of abnormality in a system corresponding to the master angle control section.

5. The rotary electric machine control device according to claim 4, wherein:
the slave angle control section is configured to limit a calculation of the slave angle control command value thereof in case that the master angle control command value is available.

6. The rotary electric machine control device according to claim 1, wherein:
in case at least one of systems corresponding to the master torque control section and the master angle control section is abnormal and a command value calculated by one of the master torque control section and the master angle control section in the torque control mode and the angle control mode, the plurality of control circuits limit a part of calculation performed by the one of the master torque control section and the master angle control section.

7. The rotary electric machine control device according to claim 1, wherein:
the plurality of control circuits is configured to acquire the angle command value from an external control circuit;
the plurality of control circuits is configured to prohibit a switching to the angle control mode and continue the torque control mode in case of an occurrence of abnormality between the external control unit and a part of the plurality of control circuits in the torque control mode;
the plurality of control circuits is configured to stop the angle control mode and switch to the torque control mode in case of an occurrence of abnormality between the external control circuit and the master angle control section in the angle control mode; and
the plurality of control circuits is configured to continue the angle control mode by using a system corresponding to the master angle control section in case of an occurrence of abnormality between the external control circuit and a control section other than the master angle control section in the angle control mode.

8. The rotary electric machine control device according to claim 1, wherein:

the plurality of control circuits is configured to continue driving of the rotary electric machine by a system corresponding to a control section capable of a command value calculation normally in case of an occurrence of abnormality in a command value calculation of a part of the plurality of control circuits in the torque control mode;
the plurality of control circuits is configured to stop the angle control mode and switch to the torque control mode in case of an occurrence of abnormality in the command value calculation in the angle control mode; and
the plurality of control circuits is configured to continue the angle control mode by using a system corresponding to the master angle control section in case of an occurrence of abnormality in the command value calculation in a control section other than the master angle control section in the angle control mode.

9. The rotary electric machine control device according to claim 1, wherein:
the plurality of control circuits is configured to continue driving of the rotary electric machine by using a system corresponding to a normal driving system in case of an occurrence of abnormality in a part of driving systems forming a current supply path to the winding in the torque control mode;
the plurality of control circuits is configured to stop the angle control mode and switch to the torque control mode of a system corresponding to a normal driving system in case of an occurrence of abnormality in a driving system corresponding to the master angle control section in the angle control mode; and
the plurality of control circuits is configured to continue the angle control mode by using the system corresponding to the master angle control section in case of an occurrence of abnormality in a driving system corresponding to a control section other than the master angle control section in the angle control mode.

10. The rotary electric machine control device according to claim 1, wherein:
the plurality of control circuits is configured to continue the torque control mode or the angle control mode without sharing a command value in case of an occurrence of abnormality in communication among the plurality of control circuits.

11. The rotary electric machine control device according to claim 1, wherein:
a control section for calculating a command value to be used for controlling the rotary electric machine is switched from one control section to an other control section in case of an occurrence of abnormality; and
the other control section receives the command value and an integration value calculated by the one control section and continues calculation of the command value and the integration value after the occurrence of abnormality.

12. The rotary electric machine control device according to claim 1, wherein:
the plurality of control circuits is configured to switch the angle control mode and the torque control mode based on a mode command received from an external control unit.

13. A rotary electric machine control method for controlling driving of a rotary electric machine provided to control a steering operation of a vehicle by a plurality of control circuits including a first control circuit and a second control circuit different from each other, the rotary electric machine control method comprising steps of:
- calculating, by the first control circuit, a master torque control command value for controlling a torque of the rotary electric machine in a torque control mode and a slave angle control command value for controlling an angle of the rotary electric machine in an angle control mode;
- calculating, by the second control circuit, a master angle control command value for controlling the angle of the rotary electric machine in the angle control mode and a slave torque control command value for controlling the torque of the rotary electric machine in the torque control mode;
- communicating calculated control command values between the first control circuit and the second control circuit;
- controlling the rotary electric machine by using the master torque control command value in the torque control mode and the master angle control command value in the angle control mode in case that a first system including the first control circuit and a second system including the second control circuit are normal, respectively; and
- controlling the rotary electric machine by using the slave torque control command value in the torque control mode and the slave angle control command value in the angle control mode in case that the first system including the first control circuit and the second system including the second control circuit are abnormal, respectively.

14. The rotary electric machine control method according to claim 13, further comprising the step of:
- limiting calculations of the slave angle control command value in the first control circuit and the slave torque control command value in the second control circuit, in case that the master angle control command value of the second control circuit is available and the master torque control value of the first control circuit is available, respectively.

15. The rotary electric machine control method according to claim 13, further comprising the step of:
- limiting calculations of the master angle control command value in the second control circuit and the master torque control command value in the first control circuit, in case that the slave angle control command value and the slave torque control command value are used in the angle control mode and the torque control mode, respectively.

16. The rotary electric machine control method according to claim 13, further comprising the step of:
- differentiating an abnormal time measure depending on a location of an occurrence of abnormality and whether the control mode at the time of the occurrence of abnormality is the torque control mode and the angle control mode.

\* \* \* \* \*